US012668602B2

(12) United States Patent
Shin et al.

(10) Patent No.: US 12,668,602 B2
(45) Date of Patent: Jun. 30, 2026

(54) COMPOUND, ANTI-REFLECTIVE FILM INCLUDING SAME, AND DISPLAY DEVICE

(71) Applicant: SAMSUNG SDI CO., LTD., Yongin-si (KR)

(72) Inventors: Insub Shin, Suwon-si (KR); Kyuyoung Kim, Suwon-si (KR); Kyubuem Choi, Suwon-si (KR); Eun Sun Yu, Suwon-si (KR)

(73) Assignee: SAMSUNG SDI CO., LTD., Yongin-si (KR)

(*) Notice: Subject to any disclaimer, the term of this patent is extended or adjusted under 35 U.S.C. 154(b) by 885 days.

(21) Appl. No.: 17/921,139

(22) PCT Filed: Mar. 11, 2021

(86) PCT No.: PCT/KR2021/003001
§ 371 (c)(1),
(2) Date: Oct. 25, 2022

(87) PCT Pub. No.: WO2021/221304
PCT Pub. Date: Nov. 4, 2021

(65) Prior Publication Data

US 2023/0183271 A1 Jun. 15, 2023

(30) Foreign Application Priority Data

Apr. 29, 2020 (KR) ........................ 10-2020-0052566

(51) Int. Cl.
*C07F 5/05* (2006.01)
*G02B 1/111* (2015.01)

(52) U.S. Cl.
CPC ................ *C07F 5/05* (2013.01); *G02B 1/111* (2013.01)

(58) Field of Classification Search
None
See application file for complete search history.

(56) References Cited

U.S. PATENT DOCUMENTS

| | | | |
|---|---|---|---|
| 8,486,311 B1 | 7/2013 | Takiff et al. | |
| 2018/0134952 A1 | 5/2018 | Ichihashi et al. | |
| 2019/0263836 A1 | 8/2019 | Oh et al. | |
| 2021/0115282 A1 | 4/2021 | Mangold et al. | |
| 2021/0222060 A1* | 7/2021 | Moon | G02B 5/23 |

FOREIGN PATENT DOCUMENTS

| | | | |
|---|---|---|---|
| CN | 112041322 A | | 12/2020 |
| JP | 2006-251076 A | | 9/2006 |
| JP | 2010-018788 A | | 1/2010 |
| JP | 5548394 B2 | * | 7/2014 |
| JP | 6299870 B2 | | 3/2018 |
| JP | 2019-165102 A | | 9/2019 |
| JP | 2019-524717 A | | 9/2019 |

(Continued)

OTHER PUBLICATIONS

English translation of WO-2015174662-A1 (Year: 2025).*

(Continued)

*Primary Examiner* — Amy C Bonaparte
(74) *Attorney, Agent, or Firm* — Lee IP Law, P.C.

(57) ABSTRACT

Provided are a compound represented by specific Chemical Formula, an antireflection film including the same and a display device including the antireflection film.

16 Claims, 4 Drawing Sheets

(56) References Cited

FOREIGN PATENT DOCUMENTS

| | | | | | |
|---|---|---|---|---|---|
| JP | 2020-050650 | A | | 4/2020 | |
| KR | 10-2015-0120243 | A | | 10/2015 | |
| KR | 10-2015-0131807 | A | | 11/2015 | |
| KR | 10-2019-0109988 | A | | 9/2019 | |
| KR | 20190109988 | A | * | 9/2019 | ............... B32B 7/12 |
| TW | 201938694 | A | | 10/2019 | |
| WO | WO 2015/174663 | A1 | | 11/2015 | |
| WO | WO-2015174662 | A1 | * | 11/2015 | ............... G02B 5/20 |
| WO | WO 2019/146332 | A1 | | 8/2019 | |
| WO | WO 2019/181858 | A1 | | 9/2019 | |
| WO | WO-2019243286 | A1 | * | 12/2019 | ............. C09K 11/06 |
| WO | WO 2020/175901 | A | | 9/2020 | |
| WO | WO-2020175901 | A1 | * | 9/2020 | .............. C07F 5/027 |

OTHER PUBLICATIONS

English translation of JP-5548394-B2 (Year: 2025).*
English translation of KR-20190109988-A (Year: 2025).*
Gartzia-Rivero ("Modulation of ICT probability in bi(polyarene)-based O-BODIPYS: towards the development of low-cost right arene-BODIPY dyads" Dalton Transactions, 2017, p. 11830). (Year: 2017).*
Chinese Office action dated Dec. 18, 2024.
Japanese Office Action dated Oct. 17, 2023, of the corresponding Japanese Patent Application No. 2022-566151.
Tahtaoui et al., J. Org. Chem., vol. 72 (1), pp. 269-272 (2007).
Richards et al., Chem. Commun., vol. 48, 1751-1753 (2012).
International Search Report dated Jun. 15, 2021 for PCT/KR2021/003001.

* cited by examiner

COMPOUND, ANTI-REFLECTIVE FILM INCLUDING SAME, AND DISPLAY DEVICE

CROSS REFERENCE TO RELATED APPLICATIONS

This is the U.S. national phase application based on PCT Application No. PCT/KR2021/003001, filed Mar. 11, 2021, which is based on Korean Patent Application No. 10-2020-0052566, filed Apr. 29, 2020, the entire contents of all of which are hereby incorporated by reference.

TECHNICAL FIELD

This disclosure relates to a compound, an antireflection film including the same, and a display device including the antireflection film.

BACKGROUND ART

In a typical liquid crystal display (LCD), light emitted from a white light source passes through an RGB color filter of each pixel to form a sub-pixel of each color, and a color in the RGB range may be produced by combining these.

In recent years, new displays using light emitting bodies such as quantum dots and organic-inorganic phosphors that emit the color of each sub-pixel are being developed. A method of using a UV light source and a method of using a blue light source have been proposed as methods of excitation of these blue, green, and red light sources.

When a UV light source is used, each color is generated and implemented with blue, green, and red light emitting bodies, but when a blue light source is used, green and red are each color generated by light emitting bodies, and blue pixels transmit the light source as it is.

In the case of a display material including quantum dots recently commercialized or under development, light emission of green quantum dots and red quantum dots through a blue light source or a white light source is used. Quantum dot-containing display devices are intended to improve color reproducibility and luminance by using a quantum dot material, and development of a panel using quantum dot light emission using various types of light sources has been continuously made. In addition, it is possible to improve a viewing angle according to the location of the quantum dot material in a panel configuration. Next-generation quantum dot display devices are being developed in terms of increasing an intensity of a light source or in terms of developing a light source with an extended blue area in order to improve luminous efficiency of the quantum dots.

In a quantum dot display device, a spectrum of the light source reaching the quantum dot material has a very close effect on the efficiency of the quantum dot. Since characteristics of each light source are different depending on the type of light source, efforts in various fields are being continued to introduce a new approach in order to improve efficiency of each light source.

On the other hand, in the case of a new display using a light emitting body, it is necessary to lower a reflectance by external light or adjust a panel color caused by scattered reflection. In order to solve this problem, there has been an attempt to use a dye in the optical member constituting the panel. When a quantum dot is used as the light emitting body, it is difficult to decrease the reflectance by external light or to adjust the panel color.

Accordingly, in the case of new displays, antireflection films with improvement of luminance loss or color correction are being introduced, and recently, there are attempts to additionally apply cyanine-based dyes or azo-based dyes as dyes capable of absorbing light of a specific wavelength to maximize the low-reflection characteristics of the antireflection film.

However, the cyanine-based dye or azo-based dye is capable of absorbing light in a short wavelength region, but has a problem of lowering light resistance reliability, and thus it is difficult to apply it to an antireflection film.

DISCLOSURE

Technical Problem

An embodiment provides a compound capable of absorbing light in a blue long wavelength region and a green short wavelength region of a light source.

Another embodiment provides an antireflection film including the compound.

Another embodiment provides a display device including the antireflection film.

Technical Solution

An embodiment provides a compound represented by Chemical Formula 1.

[Chemical Formula 1]

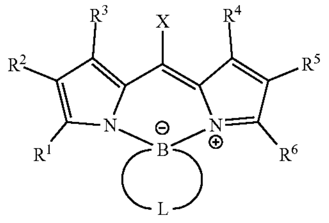

In Chemical Formula 1, $R^1$, $R^3$, $R^4$, and $R^6$ are each independently a hydrogen atom or a substituted or unsubstituted C1 to C20 alkyl group, $R^2$ and $R^5$ are each independently a hydrogen atom or a cyano group, provided that at least one of $R^2$ and $R^5$ is a cyano group, X is a hydrogen atom, a substituted or unsubstituted C1 to C20 alkoxy group, a substituted or unsubstituted C1 to C20 alkyl group, or a substituted or unsubstituted C6 to C20 aryl group, and L is a divalent ligand.

$R^2$ and $R^5$ may each independently be a cyano group.

L may be a catechol-based ligand, a 2,3-naphthalenediol-based ligand, or a 1,1'-bi-2-naphthol-based ligand.

Chemical Formula 1 may be represented by Chemical Formula A or Chemical Formula B.

[Chemical Formula A]

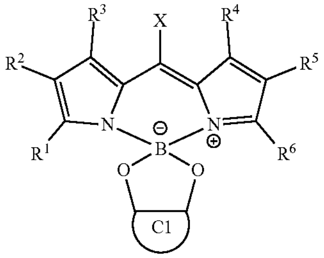

[Chemical Formula B]

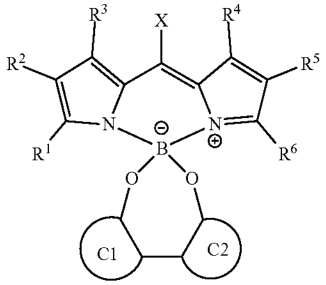

In Chemical Formula A and Chemical Formula B, $R^1$, $R^3$, $R^4$, and $R^6$ are each independently a hydrogen atom or a substituted or unsubstituted C1 to C20 alkyl group, $R^2$ and $R^5$ are each independently a hydrogen atom or a cyano group, provided that at least one of $R^2$ and $R^5$ is a cyano group, X is a hydrogen atom, a substituted or unsubstituted C1 to C20 alkoxy group, a substituted or unsubstituted C1 to C20 alkyl group, or a substituted or unsubstituted C6 to C20 aryl group, and C1 and C2 are each independently a substituted or unsubstituted aromatic ring.

The X may be a substituted or unsubstituted C1 to C20 alkoxy group, a substituted or unsubstituted C1 to C20 alkyl group that is substituted or unsubstituted with 'an unsubstituted C1 to C10 alkyl group, a C to C10 alkyl group that is substituted or unsubstituted with a halogen atom, a C1 to C10 alkyl group substituted with a C1 to C5 alkyl group, an unsubstituted C1 to C10 alkoxy group, or a combination thereof or an C6 to C20 aryl group that is substituted or unsubstituted with 'an unsubstituted C1 to C10 alkyl group, a C1 to C10 alkyl group that is substituted or unsubstituted with a halogen atom, a C1 to C10 alkyl group substituted with a C1 to C5 alkyl group, an unsubstituted C1 to C10 alkoxy group, or a combination thereof.'

X may be an unsubstituted C1 to C20 alkoxy group, an unsubstituted C1 to C20 alkyl group, an unsubstituted C6 to C20 aryl group, a C6 to C20 aryl group that is substituted with 'an unsubstituted C1 to C10 alkyl group,' a C6 to C20 aryl group that is substituted with 'a halogen atom,' a C6 to C20 aryl group that is substituted with 'a C1 to C10 alkyl group substituted with a halogen atom,' or a C6 to C20 aryl group that is substituted with 'an unsubstituted C1 to C10 alkoxy group.'

The C1 and C2 may each independently be a substituted or unsubstituted benzene ring or a substituted or unsubstituted naphthalene ring.

The C1 and C2 may each independently be a benzene ring that is substituted or unsubstituted with 'a halogen atom, a cyano group, a C1 to C10 alkyl group, *—C(═O) R' (R' is a C1 to C10 alkyl group), or a combination thereof,' or a naphthalene ring that is substituted or unsubstituted with 'a halogen atom, a cyano group, a C1 to C10 alkyl group, *—C(═O)R'(R' is a C1 to C10 alkyl group), or a combination thereof.'

The compound may be represented by one of Chemical Formula Chemical Formula 1-1-1 to Chemical Formula 1-1-8.

[Chemical Formula 1-1-1]

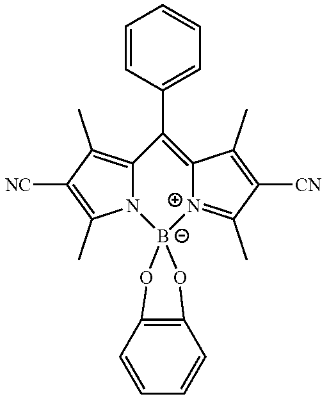

[Chemical Formula 1-1-2]

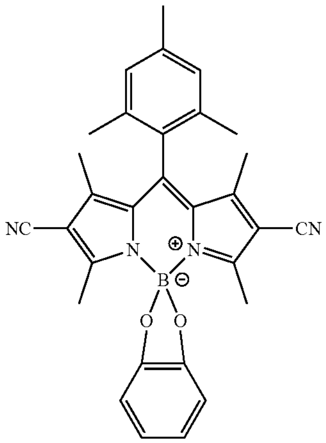

[Chemical Formula 1-1-3]

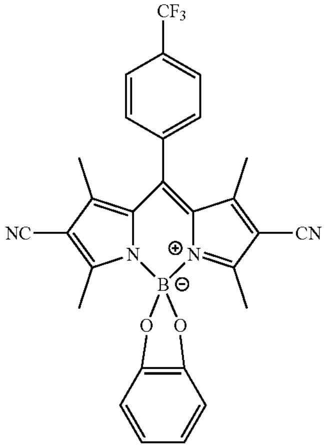

-continued

[Chemical Formula 1-1-4]

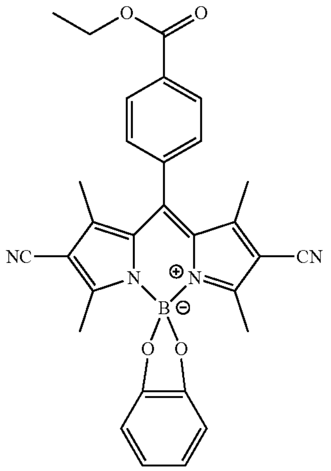

[Chemical Formula 1-1-5]

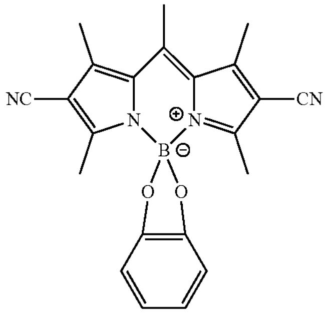

[Chemical Formula 1-1-6]

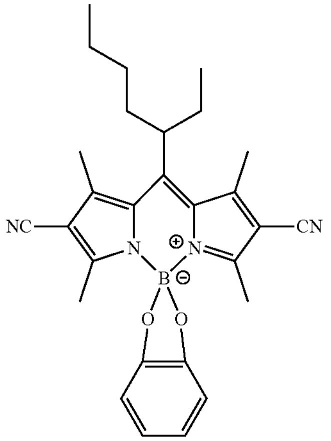

-continued

[Chemical Formula 1-1-7]

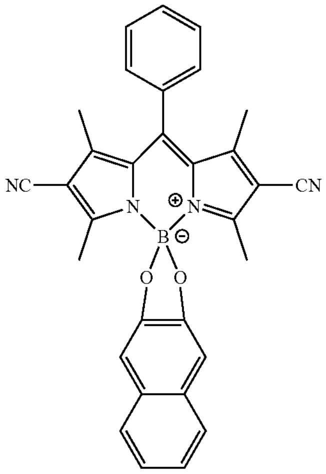

[Chemical Formula 1-1-8]

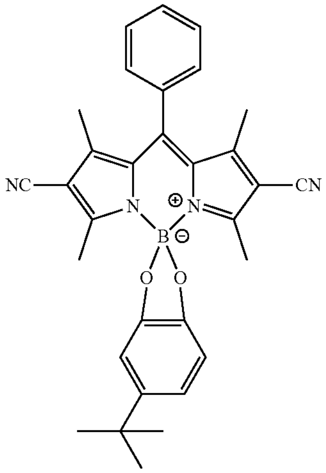

The compound represented by Chemical Formula 1 may exhibit an absorption wavelength at 400 nm to 530 nm, and may have a maximum absorption wavelength at 490 nm to 520 nm of the absorption wavelengths.

The compound may be a dye.

Another embodiment provides an antireflection film including the compound represented by Chemical Formula 1.

The antireflection film includes an adhesive layer and an antireflection layer on the adhesive layer, and the compound represented by Chemical Formula 1 may be included in the adhesive layer.

The antireflection film includes an adhesive layer, a dye-containing layer, and an antireflection layer on the dye-containing layer, and the compound represented by Chemical Formula 1 may be included in the dye-containing layer.

Another embodiment provides a display device including the antireflection film.

The display device may further include a quantum dot-containing layer.

The display device may further include a light source, a color filter, and a substrate.

In the display device, the quantum dot-containing layer may be disposed on the light source, the color filter may be disposed on the quantum dot-containing layer, the substrate may be disposed on the color filter, and the antireflection film may be disposed on the substrate.

The light source may be a white light source or a blue light source.

The substrate may include a glass substrate.

Other embodiments of the present invention are included in the following detailed description.

Advantageous Effects

By using the compound having an absorption in a blue long wavelength region and a green short wavelength region and a maximum absorption wavelength from 490 nm to 520 nm, and more specifically 500 nm to 510 nm, there is no fluorescence, and light resistance reliability may be improved by lowering a reflectance of a display device by external light, and also luminance loss and color reproducibility may be improved.

BEST MODE

Figure 1:
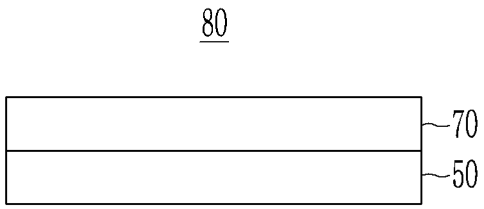
FIGS. 1 and 2 are schematic views each independently illustrating an antireflection film according to an embodiment.

Hereinafter, embodiments of the present invention are described in detail. However, these embodiments are exemplary, the present invention is not limited thereto and the present invention is defined by the scope of claims.

As used herein, when specific definition is not otherwise provided, "alkyl group" refers to a C1 to C20 alkyl group, "alkenyl group" refers to a C2 to C20 alkenyl group, "cycloalkenyl group" refers to a C3 to C20 cycloalkenyl group, "heterocycloalkenyl group" refers to a C3 to C20 heterocycloalkenyl group, "aryl group" refers to a C6 to C20 aryl group, "arylalkyl group" refers to a C6 to C20 arylalkyl group, "alkylene group" refers to a C1 to C20 alkylene group, "arylene group" refers to a C6 to C20 arylene group, "alkylarylene group" refers to a C6 to C20 alkylarylene group, "heteroarylene group" refers to a C3 to C20 hetero arylene group, and "alkoxyl group" refers to a C1 to C20 alkoxyl group.

As used herein, when specific definition is not otherwise provided, "substituted" refers to replacement of at least one hydrogen by a substituent of a halogen atom (F, Cl, Br, I), a hydroxy group, a C1 to C20 alkoxy group, a nitro group, a cyano group, amine group, imino group, an azido group, an amidino group, a hydrazino group, a hydrazono group, a carbonyl group, a carbamyl group, a thiol group, an ester group, ether group, a carboxyl group or a salt thereof, sulfonic acid group or a salt thereof, phosphoric acid or a salt thereof, C1 to C20 alkyl group, a C2 to C20 alkenyl group, a C2 to C20 alkynyl group, a C6 to C20 aryl group, a C3 to C20 cycloalkyl group, a C3 to C20 cycloalkenyl group, a C3 to C20 cycloalkynyl group, a C2 to C20 heterocycloalkyl group, a C2 to C20 heterocycloalkenyl group, a C2 to C20 heterocycloalkynyl group, a C3 to C20 heteroaryl group, or a combination thereof.

As used herein, when specific definition is not otherwise provided, "hetero" refers to inclusion of at least one heteroatom of N, O, S, and P in a chemical formula.

As used herein, when specific definition is not otherwise provided, "(meth)acrylate" refers to both "acrylate" and "methacrylate," and "(meth)acrylic acid" refers to "acrylic acid" and "methacrylic acid".

As used herein, when specific definition is not otherwise provided, the term "combination" refers to mixing or copolymerization.

As used herein, unless a specific definition is otherwise provided, a hydrogen atom is boned at the position when a chemical bond is not drawn where supposed to be given.

When describing the numerical range in the present specification, "X to Y" means "greater than or equal to X and less than or equal to Y" (X≤and ≤Y).

In the description that is not a numerical range in the present specification, "X to Y" means "from X to Y."

In the present specification, a "maximum absorption wavelength ($\lambda_{max}$)" of a compound (dye) refers to a wavelength at which the maximum absorbance appears when absorbance is measured for a solution of a compound (dye) at a concentration of 10 ppm in cyclohexanone. The maximum absorbance may be measured according to a method known to those skilled in the art.

As used herein, "light resistance reliability" is evaluated by a change of light transmittance. The light transmittance of a display device is measured at a maximum absorption wavelength of a dye before and after irradiation under the conditions of in the Xenon Test Chamber (Q-SUN) [light source lamp: Xenon lamp, irradiation intensity: 0.35 W/cm$^2$, irradiation temperature: 63° C., irradiation time: 500 hours, and irradiation direction: irradiation from the antireflection film side].

In addition, as used herein, unless a specific definition is otherwise provided, "*" means a moiety linked with the same or different atoms or chemical formulas.

According to an embodiment, a compound represented by Chemical Formula 1 is provided.

[Chemical Formula 1]

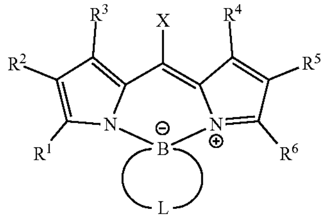

In Chemical Formula 1, $R^1$, $R^3$, $R^4$, and $R^6$ are each independently a hydrogen atom or a substituted or unsubstituted C1 to C20 alkyl group, $R^2$ and $R^5$ are each independently a hydrogen atom or a cyano group, provided that at least one of $R^2$ and $R^5$ is a cyano group, X is a hydrogen atom, a substituted or unsubstituted C1 to C20 alkoxy group, a substituted or unsubstituted C1 to C20 alkyl group, or a substituted or unsubstituted C6 to C20 aryl group, and L is a divalent ligand.

Conventionally, there have been attempts to improve a color purity of a display device by absorbing a neon color using a specific compound to block a specific wavelength region of a light source, but a display device including quantum dots has a different purpose due to the use of a scattering body. A quantum dot-containing display device may lower a reflectance in order to improve reflection of external light caused by a scattering body, which helps improve black visibility of the device. Specifically, in order to lower the reflectance and minimize a decrease in the RGB color purity of the panel, an antireflection film using a dye capable of absorbing mixed colors (violet/cyan/neon/near-IR) is effective. In particular, absorption of external light of a cyan color having an absorption wavelength range of 480 nm to 520 nm and a neon color having an absorption wavelength range of 530 nm to 670 nm is effective in reducing reflectance. However, in the case of using only dyes that absorb only cyan and neon colors, it is difficult to implement neutral black in the display device. Therefore, violet colors with an absorption wavelength range of 350 nm to 450 nm and near-IR (red) colors with an absorption wavelength range of 605 nm to 790 nm are used. Color correction of the antireflective film and display device may be possible by using a mixture of absorbing dyes. That is, by using dyes that can absorb mixed colors (violet/cyan/neon/near-IR), the reflectance may be lowered, the black visibility may be improved, and the color reproducibility may be increased. On the other hand, the compound represented by Chemical Formula 1 may improve light resistance reliability, which is one of the disadvantages of conventional compounds (dyes) that absorb a specific wavelength range. That is, when the compound represented by Chemical Formula 1 according to an embodiment is applied to an antireflection film, light resistance reliability of the film may be secured. In particular, in a display device using a quantum dot emitter, an attempt to improve the color reproducibility by using a specific compound to absorb mixed colors has not been known until now. For example, in the case of neon color, the absorption wavelength range is 530 nm to 670 nm, and in the case of near-IR color, the absorption wavelength range is 605 nm to 790 nm. However, since the compound represented by Chemical Formula 1 according to an embodiment exhibits an absorption wavelength at 400 nm to 530 nm, and may have a maximum absorption wavelength at 490 nm to 520 nm, and more specifically 500 nm to 510 nm of the absorption wavelength, in the case of an antireflection film and a display device including the compound represented by Chemical Formula 1 as a dye, light resistance reliability may be easily secured while minimizing deterioration in blue luminance.

As will be described later, when considering a spectrum of a light source applied to a display device, it is necessary to effectively absorb the blue long wavelength region and the green short wavelength region (about 490 nm to 520 nm) of the light source, so that the color reproducibility of the panel may be effectively improved. For example, when the maximum absorption wavelength of the compound applied to the antireflection film is shorter than 500 nm or longer than 520 nm and full width at half maximum (FWHM) is wide, the blue long wavelength region and the green short wavelength region cannot be effectively absorbed, so it is difficult to achieve an effect of improving the color reproducibility of the panel. Accordingly, as the maximum absorption wavelength of the compound applied to the antireflection film appears between 500 nm and 510 nm, the blue long wavelength region and the green short wavelength region may be effectively absorbed. The compound represented by Chemical Formula 1 according to an embodiment has a maximum absorption wavelength at 490 nm to 520 nm, and more specifically 500 nm to 510 nm due to its structural specificity, and thus the blue long wavelength region and the green short wavelength region may be effectively absorbed, and light resistance reliability may be secured and the color reproducibility of panels may be effectively improved.

In Chemical Formula 1, at least one of $R^2$ and $R^5$ should be necessarily a cyano group.

In Chemical Formula 1, when at least one of $R^2$ and $R^5$ is not necessarily a cyano group, (e.g., when $R^2$ and $R^5$ are each independently a hydrogen atom and/or an alkyl group), it is difficult to ensure excellent light resistance reliability. Likewise, in Chemical Formula 1, the cyano group should be located at at least one of $R^2$ and $R^5$. In particular, in the case of a quantum dot-containing display, excellent light resistance reliability may be secured only when an antireflection film including the compound represented by Chemical Formula 1 is applied. Even if it is a compound for an antireflection film showing excellent light resistance in conventional LCDs, light resistance may be deteriorated when this is applied to a quantum dot-containing display as it is.

For example, in Chemical Formula 1, $R^2$ and $R^5$ may each independently be a cyano group. When both $R^2$ and $R^5$ are the cyano groups, there is little change in the maximum absorption wavelength and full width at half maximum (FWHM), compared with the case where only one of $R^2$ and $R^5$ is the cyano group, and at the same time, the light resistance reliability itself may be greatly improved.

For example, in Chemical Formula 1, L may be a catechol-based ligand, a 2,3-naphthalenediol-based ligand, or a 1,1'-bi-2-naphthol-based ligand.

Wherein L is not the catechol-based ligand, the 2,3-naphthalenediol-based ligand, or the 1,1'-bi-2-naphthol-based ligand (for example, in the case of F, etc.), it is impossible to be applied to the antireflective film according to an embodiment because fluorescent characteristics are expressed. Conventionally, in order to solve this problem, a catechol-based ligand is used as the ligand. However, by using the catechol-based ligand, non-fluorescent characteristics may be achieved, but excellent light resistance reliability cannot be secured. Accordingly, efforts have been made for a long time to improve the light resistance reliability while maintaining the non-fluorescent characteristics by using the catechol-based ligand. While maintaining the non-fluorescent characteristics, there are reports that the light resistance reliability is slightly improved, but all of these reports are based on the premise of application in the conventional LCD. In the case of applying the compound or antireflection film mentioned in the above reports to a quantum dot-containing display, which are trends of the recent display market, the decrease light resistance reliability reappears and thus demand for compounds for antireflection films on the premise of applying quantum dot-containing displays is rapidly increasing day by day.

The present inventors accurately recognized the recent trends and demands of the market as described above, and after careful analysis of the conventional problems, and after numerous trials and errors, the inventor invents a compound that absorbs at 400 nm to 520 nm in the quantum dot-containing display as in the conventional LCD display, has a maximum absorption wavelength at 490 nm to 520 nm among the absorption wavelengths, and secures excellent light resistance reliability.

For example, Chemical Formula 1 may be represented by Chemical Formula A or Chemical Formula B.

[Chemical Formula A]

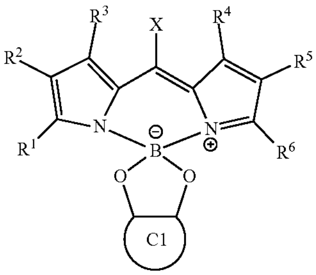

[Chemical Formula B]

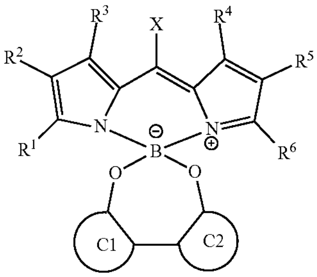

In Chemical Formula A and Chemical Formula B, $R^1$, $R^3$, $R^4$, and $R^6$ are each independently a hydrogen atom or a substituted or unsubstituted C1 to C20 alkyl group, $R^2$ and $R^5$ are each independently a hydrogen atom or a cyano group, provided that at least one of $R^2$ and $R^5$ is a cyano group, X is a hydrogen atom, a substituted or unsubstituted C1 to C20 alkoxy group, a substituted or unsubstituted C1 to C20 alkyl group, or a substituted or unsubstituted C6 to C20 aryl group, and C1 and C2 are each independently a substituted or unsubstituted aromatic ring.

For example, X may be a substituted or unsubstituted C1 to C20 alkoxy group, a substituted or unsubstituted C1 to C20 alkyl group that is substituted or unsubstituted with 'an unsubstituted C1 to C10 alkyl group, a C1 to C10 alkyl group that is substituted or unsubstituted with a halogen atom, a C1 to C10 alkyl group substituted with a C1 to C5 alkyl group, an unsubstituted C1 to C10 alkoxy group, or a combination thereof or an C6 to C20 aryl group that is substituted or unsubstituted with 'an unsubstituted C1 to C10 alkyl group, a C1 to C10 alkyl group that is substituted or unsubstituted with a halogen atom, a C1 to C10 alkyl group substituted with a C1 to C5 alkyl group, an unsubstituted C1 to C10 alkoxy group, or a combination thereof.'

For example, X may be an unsubstituted C1 to C20 alkyl group, an unsubstituted C6 to C20 aryl group, a C6 to C20 aryl group substituted with 'an unsubstituted C1 to C10 alkyl group,' a C6 to C20 aryl group substituted with 'a C1 to C10 alkyl group substituted with a halogen atom,' or a C6 to C20 aryl group substituted with 'an unsubstituted C1 to C10 alkoxy group.'

For example, C1 and C2 may each independently be a substituted or unsubstituted benzene ring or a substituted or unsubstituted naphthalene ring, but other aromatic rings other than the benzene ring or naphthalene ring may be used.

For example, the C1 and C2 may each independently be a benzene ring that is substituted or unsubstituted with 'a halogen atom, a cyano group, a C1 to C10 alkyl group, *—C(=O) R' (R' is a C1 to C10 alkyl group), or a combination thereof,' or a naphthalene ring that is substituted or unsubstituted with 'a halogen atom, a cyano group, a C1 to C10 alkyl group, *—C(=O) R' (R' is a C1 to C10 alkyl group), or a combination thereof,' but is not limited thereto.

For example, the compound represented by Chemical Formula 1 may be one of Chemical Formula Chemical Formula 1-1-1 to Chemical Formula 1-1-8, but is not necessarily limited thereto.

[Chemical Formula 1-1-1]

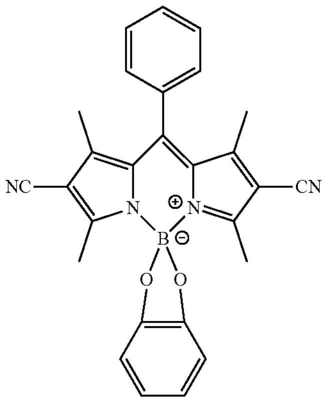

[Chemical Formula 1-1-2]

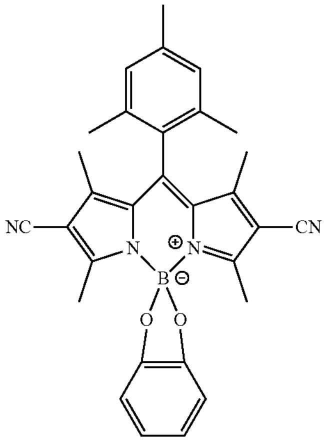

[Chemical Formula 1-1-3]

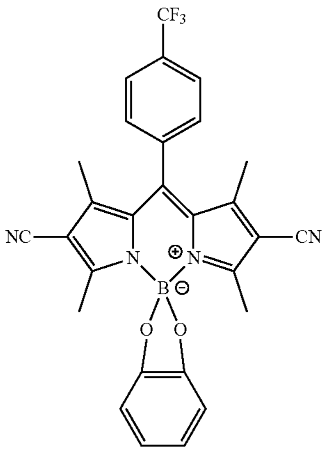

-continued

[Chemical Formula 1-1-4]

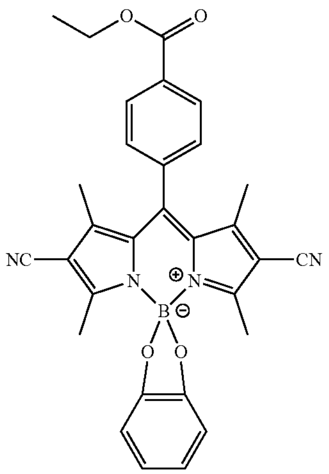

[Chemical Formula 1-1-5]

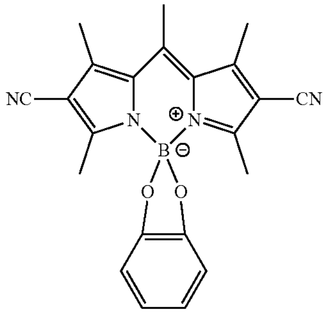

[Chemical Formula 1-1-6]

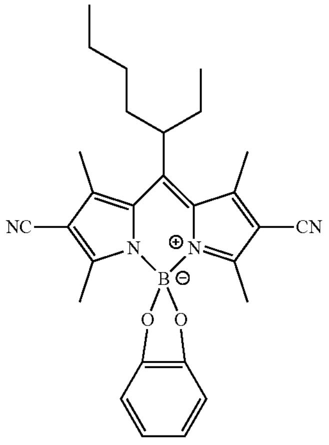

-continued

[Chemical Formula 1-1-7]

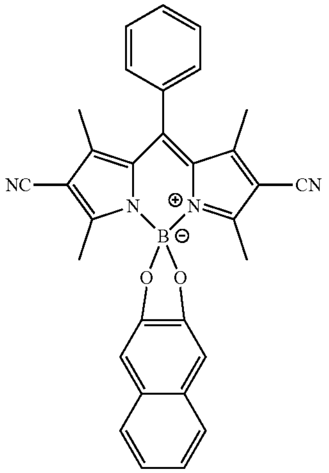

[Chemical Formula 1-1-8]

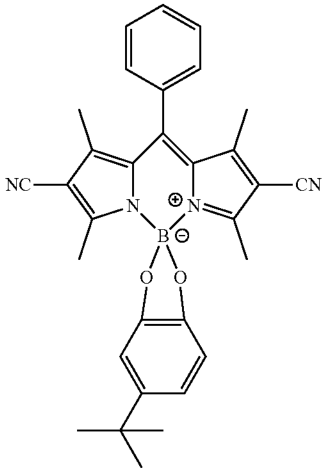

The compound represented by Chemical Formula 1 may exhibit an absorption wavelength at 400 nm to 520 nm, and may have a maximum absorption wavelength at 490 nm to 520 nm, and more specifically, 500 nm to 510 nm among the absorption wavelengths. As described above, when the compound represented by Chemical Formula 1 has the maximum absorption wavelength in the above range, the blue long wavelength region and the green short wavelength region may be effectively absorbed, thereby effectively improving light resistance reliability and color reproducibility of the panel.

For example, the compound represented by Chemical Formula 1 may be a dye.

Another embodiment provides an antireflection film including the compound.

The antireflective film may include 0.001 wt % to 0.5 wt % of the compound represented by Chemical Formula 1 based on a solid content. When the compound represented by Chemical Formula 1 is included in the range, it is effective to improve neutral black by easily adjusting the panel color of the display device to which the antireflection film is applied.

The antireflection film includes an adhesive layer and an antireflection layer formed on the adhesive layer, and the compound represented by Chemical Formula 1 may be included in the adhesive layer.

In addition, the antireflection film includes an adhesive layer, a dye-containing layer, and an antireflection layer formed on the dye-containing layer, and the compound represented by Chemical Formula 1 may be included in the dye-containing layer.

Figure 2:

That is, in the laminated structure of the antireflection film according to an embodiment, the compound represented by Chemical Formula 1 may be included in the adhesive layer or may be included in a separate dye-containing layer. (See FIGS. 1 and 2)

The antireflection layer may consist of only a low refractive layer or may include a low refractive layer.

The low refractive layer may lower a reflectance of the antireflection film due to a difference in refractive index between the substrate and/or the high refractive layer described later.

The low refractive layer may include a curable binder resin, a fluorine atom-containing monomer, and fine particles (e.g., hollow silica) having an average particle diameter of 5 nm to 300 nm, and the thickness of the low refractive layer may be 0.01 μm to 0.15 μm. The refractive index of the low refractive layer may be 1.20 to 1.40.

An additional function may be imparted to the antireflection film by further forming a functional coating layer on one surface of the low refractive layer, that is, on the upper surface of the low refractive layer. The functional coating layer may include an antifingerprint layer, an antistatic layer, a hard coating layer, an antiglare layer, a barrier layer, etc., but is not limited thereto.

The antireflection layer may further include a high refractive layer.

The high refractive layer is formed between the substrate to be described later and the low refractive layer, and has a refractive index between the substrate and the low refractive layer, thereby reducing the reflectance of the antireflection layer. The high refractive layer is formed directly with the substrate and the low refractive layer, respectively. The "directly formed" means that there are no other layers between the layer and the layer.

The high refractive layer has a thickness of 0.05 μm to 20 μm, a refractive index of 1.45 to 2, and a haze value specified in JIS-K7361 is not different from the haze value of the base material or 10% or less of the difference between the haze value of substrate, which is excellent in transparency and is excellent in antireflection properties.

The hard coating layer increases a hardness of the antireflection layer so that even if the antireflection layer is used on the outermost surface of the display device, scratches may not be generated. The hard coating layer is not necessarily provided. The hard coating layer may be omitted if a target hardness is secured in the high or low refractive layer.

The hard coating layer may be formed between the substrate and the high refractive layer or between the substrate and the low refractive layer.

The hard coating layer may be a cured layer formed by uniformly mixing ultrafine metal oxide particles having an average particle diameter of 1 nm to 30 nm and a particle size distribution range of less than or equal to +5 nm in a cured binder. The hard coating layer may have a thickness of 1 μm to 15 μm, and the refractive index of the hard coating layer may be greater than or equal to 1.54.

The antireflection layer may have a thickness of 50 μm to 500 μm, for example 50 μm to 300 μm, for example 50 μm to 150 μm. When the antireflection layer has a thickness within the above range, it may be easily applied to a display device.

The adhesive layer may be formed on the lower surface of the antireflection layer to adhere an optical member such as a display to a panel or the like. As described above, the adhesive layer may include a compound (dye) represented by Chemical Formula 1.

The adhesive layer may have a glass transition temperature of −70° C. to 0° C., for example −65° C. to −20° C. When the glass transition temperature of the adhesive layer is within the above range, adhesion to the panel may be improved.

The adhesive layer may be a thermosetting adhesive layer or a photocurable adhesive layer. Desirably, since the adhesive layer becomes a thermosetting adhesive layer, it is not necessary to consider the effect of ultraviolet rays due to the absorption wavelength of the compound (dye) represented by Chemical Formula 1, thereby facilitating the manufacture of the adhesive layer. The "thermosetting adhesive layer" may include not only an adhesive layer cured through a predetermined heat treatment at 40° C. to 100° C., but also an adhesive layer cured at room temperature (e.g., 20° C. to 30° C.).

The adhesive layer may be formed of a composition for an adhesive layer including an adhesive resin and a curing agent.

The type of the adhesive resin is not limited as long as it can secure the glass transition temperature of the adhesive layer. For example, the adhesive resin may be a silicone-based, urethane-based, (meth)acryl-based resin, or the like, but desirably, a (meth)acryl-based adhesive resin may be used.

The adhesive resin may have a glass transition temperature of −70° C. to 0° C., desirably-) 65° C. to −20° C. When the glass transition temperature of the adhesive resin has the above range, adhesion to the panel may be improved.

The adhesive resin may have a weight average molecular weight of 500,000 g/mol to 2,000,000 g/mol, for example 800,000 g/mol to 1,500,000 g/mol. When the weight average molecular weight of the adhesive resin has the above range, adhesion to the panel may be improved.

The adhesive resin may include a copolymer, desirably a random copolymer of at least one of a (meth)acryl-based monomer having an alkyl group; a (meth)acryl-based monomer having a hydroxyl group; and a (meth)acryl-based monomer having an aromatic group, a (meth)acryl-based monomer having an alicyclic group, and a (meth)acryl-based monomer having a heteroalicyclic group.

The (meth)acryl-based monomer having the alkyl group may include a (meth)acrylic acid ester having an unsubstituted C1 to C10 alkyl group. Specifically, the (meth)acryl-based monomer having the alkyl group may include one or more of methyl (meth)acrylate, ethyl (meth)acrylate, propyl (meth)acrylate, n-butyl (meth)acrylate, t-butyl (meth)acrylate, iso-butyl (meth)acrylate, pentyl (meth)acrylate, hexyl (meth)acrylate, 2-ethylhexyl (meth)acrylate, heptyl (meth) acrylate, octyl (meth)acrylate, iso-octyl (meth)acrylate, nonyl (meth)acrylate, and decyl (meth)acrylate, but is not limited thereto. These may be included alone or in combination of two or more. The (meth)acryl-based monomer having the alkyl group may be included in an amount of 60 wt % to 99.99 wt %, for example 60 wt % to 90 wt %, for example 80 wt % to 99.9 wt % of the monomer mixture.

The (meth)acryl-based monomer having the hydroxyl group may include one or more of a (meth)acryl-based monomer having a C1 to C20 alkyl group having at least one hydroxyl group, a (meth)acryl-based monomer having a C3 to C20 cycloalkyl group having at least one hydroxyl group, and a (meth)acryl-based monomer having a C6 to C20 aromatic group having at least one hydroxyl group. Specifically, the (meth)acryl-based monomer having the hydroxyl group may include desirably a (meth)acryl-based monomer having a C1 to C20 alkyl group having at least one hydroxyl group, one or more of 2-hydroxyethyl (meth)acrylate, 2-hydroxypropyl (meth)acrylate, 2-hydroxybutyl (meth)acrylate, 4-hydroxybutyl (meth)acrylate, 6-hydroxyhexyl (meth) acrylate, 1-chloro-2-hydroxypropyl (meth)acrylate. These may be included alone or in combination of two or more. The (meth)acryl-based monomer having the hydroxyl group may be included in an amount of 0.01 wt % to 20 wt %, for example 0.1 wt % to 10 wt % of the monomer mixture.

The (meth)acryl-based monomer having the aromatic group may include a (meth)acrylic acid ester having a C6 to C20 aryl group or a C7 to C20 arylalkyl group. Specifically, the (meth)acryl-based monomer having the aromatic group may include, but is not limited to, phenyl (meth)acrylate, benzyl (meth)acrylate, and the like. The (meth)acryl-based monomer having the aromatic group may be included in an amount of 0 wt % to 50 wt %, for example 0 wt % to 20 wt % of the monomer mixture.

In the present specification, when an alicyclic group and an alkyl group are mixed among the monomers, it is classified as a (meth)acryl-based monomer having an alicyclic group.

The (meth)acryl-based monomer having the alicyclic group may be a (meth)acrylic acid ester having a C5 to C20 monocyclic or heterocyclic alicyclic group and may include at least one of cyclohexyl (meth)acrylate, isobornyl (meth) acrylate, dicyclopentanyl (meth)acrylate, methylcyclohexyl (meth)acrylate, and dicyclopentenyl (meth)acrylate. The (meth)acryl-based monomer having the alicyclic group may be included in an amount of 0 wt % to 50 wt %, for example 1 wt % to 30 wt %, or 1 wt % to 20 wt % of the monomer mixture.

The (meth)acryl-based monomer having the heteroalicyclic group may include a (meth)acrylic acid ester having a C4 to C9 heteroalicyclic group including at least one of nitrogen, oxygen, or sulfur. Specifically, the (meth)acryl-based monomer having the heteroalicyclic group may include (meth)acryloylmorpholine, but is not limited thereto. The (meth)acryl-based monomer having the heteroalicyclic group may be included in an amount of 0 wt % to 50 wt %, for example 0 wt % to 10 wt % of the monomer mixture.

The adhesive resin may include a (meth)acryl-based copolymer of a monomer mixture including 70 wt % to 99.99 wt %, for example 90 wt % to 99.5 wt % of the (meth)acryl-based monomer having the alkyl group, 0.01 wt % to 30 wt %, for example 0.5 wt % to 10 wt % of the (meth)acryl-based monomer having the hydroxyl group. When each of the monomers constituting the adhesive resin has the above ranges, adhesive strength may be easily secured.

The curing agent may include an isocyanate-based curing agent. The curing agent may be included in an amount of 0.01 parts by weight to 20 parts by weight, for example 0.01 parts by weight to 10 parts by weight, for example 0.1 parts by weight to 4 parts by weight, based on 100 parts by weight of the adhesive resin. When the curing agent has the above range, the composition may be crosslinked to form an adhesive layer and to prevent a decrease in transparency and poor reliability due to its excessive use.

The composition may further include conventional additives such as a silane coupling agent, an antioxidant, a tackifying resin, a plasticizer, an antistatic agent, a rework agent, and a curing catalyst. The silane coupling agent may be included in an amount of 0.01 parts by weight to 20 parts by weight, for example 0.01 parts by weight to 10 parts by weight, for example 0.1 parts by weight to 4 parts by weight, based on 100 parts by weight of the adhesive resin. When the silane coupling agent has the above range, adhesion may be controlled and reliability defects may be prevented.

The composition for the adhesive layer may be a solvent-free type or may further include a conventional organic solvent to increase coating properties.

The adhesive layer may have a thickness of 1 μm to 50 μm, for example, 5 μm to 25 μm. When the adhesive layer has a thickness within the above range, it may be easily used in a display device.

According to another embodiment, a display device including the antireflection film is provided. For example, a display device including the antireflection film and the quantum dot-containing layer may be provided.

For example, the display device may further include a light source, a color filter, and a substrate.

Figure 3:
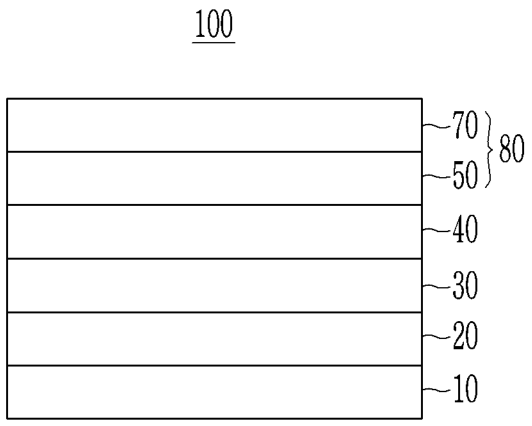
FIGS. 3 and 4 are schematic views each independently illustrating a display device according to an embodiment.
Figure 4:
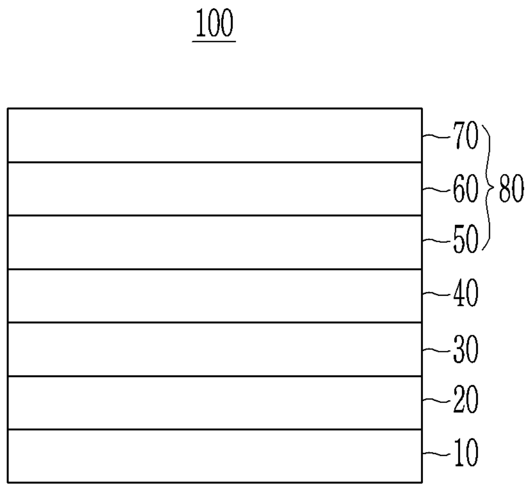

For example, the display device may have a stacked structure in which the quantum dot-containing layer may be disposed on the light source, the color filter may be disposed on the quantum dot-containing layer, the substrate may be disposed on the color filter, and the antireflection film may be disposed on the substrate. (See FIGS. 3 and 4)

For example, the light source may be a blue light source.

For example, the substrate may be a glass substrate.

Components constituting the quantum dot-containing layer may further include a binder resin, a reactive unsaturated compound, a photopolymerization initiator, a diffusion agent, and other additives, which will be described later, in addition to the quantum dot.

The quantum dot may have a maximum fluorescence emission wavelength (fluorescence $\lambda_{max}$) in 400 nm to 500 nm of a wavelength range of 350 nm to 550 nm.

The quantum dot may have a full width at half maximum (FWHM) in a range of 20 nm to 100 nm, for example, 20 nm to 50 nm. When the quantum dot has a full width at half maximum (FWHM) within the range, the quantum dot has high color purity and thus an effect on increasing color reproducibility when used as a color material in a color filter.

The quantum dot may be an organic material, an inorganic material, or a hybrid (mixture) of the organic material and the inorganic material.

The quantum dot may each independently include a core and a shell surrounding the core, and herein, the core and the shell may have a structure such as a core each independently including Group II-IV, Group III-V, and the like, a core/a shell, a core/a first shell/a second shell, an alloy, an alloy/a shell, and the like, but are not limited thereto.

For example, the core may include at least one material selected from CdS, CdSe, CdTe, ZnS, ZnSe, ZnTe, HgS, HgSe, HgTe, GaN, GaP, GaAs, InP, InAs, and an alloy thereof, but is not necessarily limited thereto. The shell surrounding the core may include at least one material selected from CdSe, ZnSe, ZnS, ZnTe, CdTe, PbS, TiO, SrSe, HgSe, and an alloy thereof but is not necessarily limited thereto.

In an embodiment, since an interest in an environment has been recently much increased over the whole world, and a regulation about a toxic material also has been fortified, a cadmium-free light emitting material (InP/ZnS) having little low quantum efficiency (quantum yield) but being environmentally-friendly instead of a light emitting material having a cadmium-based core is used but not necessarily limited thereto.

The quantum dot having a core/shell structure may have an entire size (an average particle diameter) including the shell of 1 nm to 15 nm, for example, 5 nm to 15 nm, but its structure is not particularly limited.

For example, the quantum dot may be a red quantum dot, a green quantum dot, or a combination thereof. For example, the quantum dot may include both green quantum dot and red quantum dot. In this case, the green quantum dots may be included in an amount greater than that of the red quantum dots. The red quantum dot may have an average particle diameter of 10 nm to 15 nm. The green quantum dot may have an average particle diameter of 5 nm to 8 nm.

Meanwhile, for the dispersion stability of the quantum dots, a dispersing agent may be used together. The dispersing agent may help a photoconversion material such as the quantum dot uniformly dispersed in the curable composition and include a non-ionic, anionic, or cationic dispersing agent. Specifically, the dispersing agent may include polyalkylene glycol or esters thereof, polyoxy alkylene, polyhydric alcohol ester alkylene oxide addition products, alcohol alkylene oxide addition products, sulfonate esters, sulfonate salts, carboxylate esters, carboxylate salts, alkyl amide alkylene oxide addition products, alkyl amines. They may be used alone or as a mixture of two or more. The dispersing agent may be used in an amount of 0.1 wt % to 100 wt %, for example, 10 wt % to 20 wt % based on the solid content of the photoconversion material such as the quantum dots.

The quantum dots may be included in an amount of 1 to 40 parts by weight, for example, 1 to 10 parts by weight, based on 100 parts by weight of the components constituting the quantum dot-containing layer. When the quantum dot is included within the above range, the light conversion rate is improved and the pattern characteristics and development characteristics are not impaired, so that excellent processibility may be obtained.

The binder resin may include an acryl-based resin, an epoxy resin, or a combination thereof.

The acryl-based resin is a copolymer of a first ethylenic unsaturated monomer and a second ethylenic unsaturated monomer that is copolymerizable therewith, and is a resin including at least one acryl-based repeating unit.

The first ethylenic unsaturated monomer is an ethylenic unsaturated monomer including at least one carboxyl group. Examples of the monomer include acrylic acid, methacrylic acid, maleic acid, itaconic acid, fumaric acid, or a combination thereof.

The first ethylenic unsaturated monomer may be included in an amount of 5 wt % to 50 wt %, for example, 10 wt % to 40 wt % based on the total amount of the acryl-based resin.

The second ethylenic unsaturated monomer may be an aromatic vinyl compound such as styrene, α-methylstyrene, vinyl toluene, vinylbenzylmethylether, and the like; an unsaturated carboxylate ester compound such as methyl (meth)acrylate, ethyl (meth)acrylate, butyl (meth)acrylate, 2-hydroxyethyl (meth)acrylate, 2-hydroxy butyl (meth)acrylate, benzyl (meth)acrylate, cyclohexyl (meth)acrylate, phenyl (meth)acrylate, and the like; an unsaturated carboxylic acid amino alkyl ester compound such as 2-aminoethyl (meth)acrylate, 2-dimethylaminoethyl (meth)acrylate, and the like; a carboxylic acid vinyl ester compound such as vinyl acetate, vinyl benzoate, and the like; a unsaturated carboxylic acid glycidyl ester compound glycidyl (meth) acrylate, and the like; a vinyl cyanide compound such as such as (meth)acrylonitrile, and the like; a unsaturated amide compound such as (meth)acrylamide, and the like; and the like. These may be used alone or as a mixture of two or more.

Specific examples of the acryl-based resin may be polybenzylmethacrylate, a (meth)acrylic acid/benzylmethacrylate copolymer, a (meth)acrylic acid/benzylmethacrylate/styrene copolymer, a (meth)acrylic acid/benzylmethacrylate/2-hydroxyethylmethacrylate copolymer, a (meth)acrylic acid/benzylmethacrylate/styrene/2-hydroxyethylmethacrylate copolymer, and the like, but are not limited thereto. These may be used alone or as a mixture of two or more.

The acryl-based resin may have a weight average molecular weight of 1,000 g/mol to 15,000 g/mol. When the acryl-based resin has a weight average molecular weight within the range, close-contacting properties to a substrate, and physical and chemical properties are improved and viscosity is appropriate.

The epoxy resin may be a thermally polymerizable monomer or oligomer, and may include a compound having a carbon-carbon unsaturated bond and a carbon-carbon cyclic bond.

The epoxy resin may further include a bisphenol A epoxy resin, a bisphenol F epoxy resin, a phenol novolac epoxy resin, a cyclic aliphatic epoxy resin, and an aliphatic polyglycidyl ether, but is not necessarily limited thereto.

Commercially available products of the compounds may be YX4000, YX4000H, YL6121H, YL6640, or YL6677 of Yuka Shell Epoxy Co., Ltd.; EOCN-102, EOCN-103S, EOCN-104S, EOCN-1020, EOCN-1025, or EOCN-1027 of Nippon Kayaku Co. Ltd. and EPIKOTE 180S75 of Yuka Shell Epoxy Co., Ltd.; a bisphenol A epoxy resin such as EPIKOTE 1001, 1002, 1003, 1004, 1007, 1009, 1010 and 828 of Yuka Shell Epoxy Co., Ltd.; a bisphenol F epoxy resin such as EPIKOTE 807 and 834 of Yuka Shell Epoxy Co., Ltd.; a phenol novolac epoxy resin such as EPIKOTE 152, 154, or 157H65 of Yuka Shell Epoxy Co., Ltd. and EPPN 201, 202 of Nippon Kayaku Co. Ltd.; a cyclic aliphatic epoxy resin such as CY175, CY177, and CY179 of CIBA-GEIGY A.G Corp., ERL-4234, ERL-4299, ERL-4221 and ERL-4206 of U.C.C., Showdyne 509 of Showa Denko K.K., Araldite CY-182 of CIBA-GEIGY A.G Corp., CY-192 and CY-184, Dainippon Ink & Chemicals Inc., EPICLON 200 and 400, EPIKOTE 871, 872 of Yuka Shell Epoxy Co. and EP1032H60, ED-5661, and ED-5662 of Celanese Coating Corporation; an aliphatic polyglycidylether may be EPIKOTE 190P and 191P of Yuka Shell Epoxy Co., EPOLITE 100MF of Kyoeisha Yushi Kagaku Kogyo Co., Ltd., EPIOL TMP of Nihon Yushi K. K., and the like.

The binder resin may be included in an amount of 1 to 40 parts by weight, for example, 5 to 20 parts by weight, based on 100 parts by weight of the components constituting the quantum dot-containing layer. When the binder resin is included within the above range, excellent sensitivity, developability, resolution, and linearity of the pattern may be obtained.

The reactive unsaturated compound may be used by mixing monomers or oligomers generally used in conventional photocurable compositions and thermosetting compositions.

The reactive unsaturated compound may be an acrylate-based compound. For example, at least one of ethylene glycoldiacrylate, triethylene glycoldiacrylate, 1,4-butanedioldiacrylate, 1,6-hexanedioldiacrylate, neopentylglycoldiacrylate, pentaerythritoldiacrylate, pentaerythritoltriacrylate, dipentaerythritoldiacrylate, dipentaerythritoltriacrylate, dipentaerythritolpentaacrylate, pentaerythritolhexaacrylate, bisphenol A diacrylate, trimethylolpropanetriacrylate, novolacepoxyacrylate, ethylene glycoldimethacrylate, diethylene glycoldimethacrylate, triethylene glycoldimethacrylate, propylene glycoldimethacrylate, 1,4-butanedioldimethacrylate, 1,6-hexanedioldimethacrylate or a mixture thereof may be used.

The reactive unsaturated compound may be treated with acid anhydride to improve developability.

The reactive unsaturated compound may be included in an amount of 1 to 10 parts by weight, for example, 1 to 5 parts by weight, based on 100 parts by weight of the component constituting the quantum dot-containing layer. When the reactive unsaturated compound is included within the above range, curing occurs sufficiently during exposure in the pattern formation process, resulting in excellent reliability, heat resistance, light resistance, chemical resistance, resolution, and close-contacting properties of the pattern.

The photopolymerization initiator may be a acetophenone-based compound, a benzophenone-based compound, a thioxanthone-based compound, a benzoin-based compound, an oxime-based compound, and the like.

Examples of the acetophenone-based compound may be 2,2'-diethoxy acetophenone, 2,2'-dibutoxy acetophenone, 2-hydroxy-2-methylpropinophenone, p-t-butyltrichloro acetophenone, p-t-butyldichloro acetophenone, 4-chloro acetophenone, 2,2'-dichloro-4-phenoxy acetophenone, 2-methyl-1-(4-(methylthio)phenyl)-2-morpholinopropan-1-one, 2-benzyl-2-dimethylamino-1-(4-morpholinophenyl)-butan-1-one, and the like.

Examples of the benzophenone-based compound may be benzophenone, benzoyl benzoate, benzoyl methyl benzoate, 4-phenyl benzophenone, hydroxybenzophenone, acrylated benzophenone, 4,4'-bis(dimethyl amino)benzophenone, 4,4'-bis(diethylamino)benzophenone, 4,4'-dimethylamino-benzophenone, 4,4'-dichlorobenzophenone, 3,3'-dimethyl-2-methoxybenzophenone, and the like.

Examples of the thioxanthone-based compound may be thioxanthone, 2-methylthioxanthone, isopropyl thioxanthone, 2,4-diethyl thioxanthone, 2,4-diisopropyl thioxanthone, 2-chlorothioxanthone, and the like.

Examples of the benzoin-based compound may be benzoin, benzoin methyl ether, benzoin ethyl ether, benzoin isopropyl ether, benzoin isobutyl ether, benzyldimethylketal, and the like.

Examples of the triazine-based compound may be 2,4,6-trichloro-s-triazine, 2-phenyl-4,6-bis(trichloromethyl)-s-triazine, 2-(3',4'-dimethoxystyryl)-4,6-bis(trichloromethyl)-s-triazine, 2-(4'-methoxynaphthyl)-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-biphenyl-4,6-bis(trichloromethyl)-s-triazine, bis(trichloromethyl)-6-styryl-s-triazine, 2-(naphtho-1-yl)-4,6-bis (trichloromethyl)-s-triazine,2-(4-methoxynaphtho-1-yl)-4, 6-bis(trichloromethyl)-s-triazine, 2-4-bis(trichloromethyl)-6-piperonyl-s-triazine, 2-4-bis(trichloromethyl)-6-(4-methoxystyryl)-s-triazine, and the like.

Examples of the oxime-based compound may be O-acyloxime-based compound, 2-(O-benzoyloxime)-1-[4-(phenylthio)phenyl]-1,2-octanedione, 1-(O-acetyloxime)-1-[9-ethyl-6-(2-methylbenzoyl)-9H-carbazol-3-yl]ethanone, O-ethoxycarbonyl-α-oxyamino-1-phenylpropan-1-one, and the like. Specific examples of the O-acyloxime-based compound may be 1,2-octanedione, 2-dimethylamino-2-(4-methylbenzyl)-1-(4-morpholin-4-yl-phenyl)-butan-1-one, 1-(4-phenylsulfanyl phenyl)-butane-1,2-dione-2-oxime-O-benzoate, 1-(4-phenylsulfanyl phenyl)-octane-1,2-dione-2-oxime-O-benzoate, 1-(4-phenylsulfanyl phenyl)-octan-1-oneoxime-O-acetate, 1-(4-phenylsulfanyl phenyl)-butan-1-oneoxime-O-acetate, and the like.

The photopolymerization initiator may further include a carbazole-based compound, a diketone-based compound, a sulfonium borate-based compound, a diazo-based compound, an imidazole-based compound, a biimidazole-based compound, a fluorene-based compound, and the like, besides the compounds.

The photopolymerization initiator may be used with a photosensitizer capable of causing a chemical reaction by absorbing light and becoming excited and then, transferring its energy.

Examples of the photosensitizer may be tetraethylene glycol bis-3-mercapto propionate, pentaerythritol tetrakis-3-mercapto propionate, dipentaerythritol tetrakis-3-mercapto propionate, and the like.

The photopolymerization initiator may be included in an amount of 0.1 parts by weight to 10 parts by weight, for example, 0.1 parts by weight to 5 parts by weight, based on 100 parts by weight of the components constituting the quantum dot-containing layer. When the photopolymerization initiator is included within the above range, a balance between sensitivity and developability during exposure is improved, so that a pattern having excellent resolution without residual film may be obtained.

The quantum dot-containing layer may further include a diffusion agent.

For example, the diffusion agent may include barium sulfate ($BaSO_4$), calcium carbonate ($CaCO_3$), titanium dioxide ($TiO_2$), zirconia ($ZrO_2$), or a combination thereof.

The diffusion agent reflects light not absorbed in the aforementioned quantum dot, so that the reflected light may be adsorbed again in the quantum dot. In other words, the diffusion agent increases an amount of the light absorbed in the quantum dot and thus light conversion efficiency of the curable composition.

The diffusion agent may have an average particle diameter (D50) within a range of 150 nm to 250 nm and specifically, 180 nm to 230 nm. When the diffusion agent has an average particle diameter within the range, much more excellent light scattering effects may be obtained, and light conversion efficiency may be increased.

The diffusion agent may be included in an amount of 0.1 wt % to 20 wt %, for example 0.1 wt % to 5 wt %, based on a solid content of 100 parts by weight of components constituting the quantum dot-containing layer. When the diffusion agent is included in an amount of less than 0.1 wt % based on 100 parts by weight of components constituting the quantum dot-containing layer, it is difficult to expect the effect of improving the light conversion efficiency by using the diffusion agent, while when the diffusion agent is included in an amount of greater than 5 wt %, pattern characteristics of may be deteriorated.

In order to improve the stability and dispersibility of the quantum dots, the quantum dot-containing layer may further include a thiol-based additive.

The thiol-based additive may replace the shell surface of the quantum dot, and may improve dispersion stability of a quantum dot in a solvent and may stabilize the quantum dot.

The thiol-based additive may have one or more, for example, 2 to 10, for example 2 to 4 thiol groups (—SH) at the terminal end according to its structure.

For example, the thiol-based additive may include at least two functional groups represented by Chemical Formula 2.

[Chemical Formula 2]

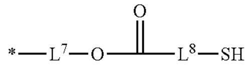

In Chemical Formula 2, $L^7$ and $L^8$ are each independently a single bond, a substituted or unsubstituted C1 to C20 alkylene group, a substituted or unsubstituted C3 to C20 cycloalkylene group, a substituted or unsubstituted C6 to C20 arylene group, or a substituted or unsubstituted C2 to C20 heteroarylene group.

For example, the thiol-based additive may be represented by Chemical Formula 3.

[Chemical Formula 3]

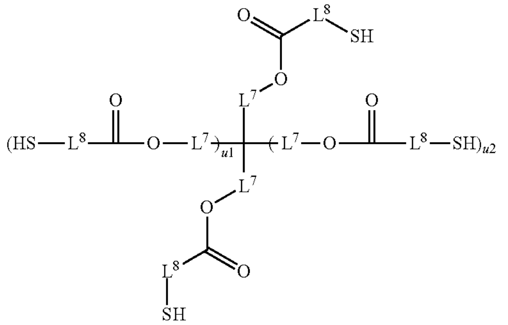

In Chemical Formula 3, $L^7$ and $L^8$ are each independently a single bond, a substituted or unsubstituted C1 to C20 alkylene group, a substituted or unsubstituted C3 to C20 cycloalkylene group, a substituted or unsubstituted C6 to C20 arylene group, or a substituted or unsubstituted C2 to C20 heteroarylene group, and u1 and u2 are each independently an integer of 0 or 1.

For example, in Chemical Formula 2 and Chemical Formula 3, $L^7$ and $L^8$ may each independently be a single bond or a substituted or unsubstituted C1 to C20 alkylene group.

Specific examples of the thiol-based additive may be selected from pentaerythritol tetrakis(3-mercaptopropionate) represented by Chemical Formula 2a, trimethylolpropane tris(3-mercaptopropionate) represented by Chemical Formula 2b, pentaerythritol tetrakis(mercaptoacetate) represented by Chemical Formula 2c, trimethylolpropane tris(2-mercaptoacetate) represented by Chemical Formula 2d, glycol di-3-mercaptopropionate represented by Chemical Formula 2e, and a combination thereof.

[Chemical Formula 2a]

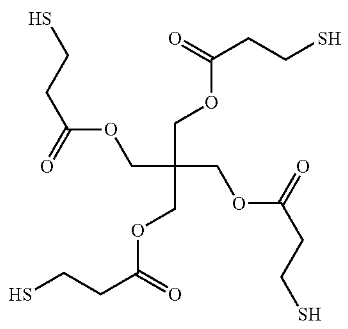

-continued

[Chemical Formula 2b]

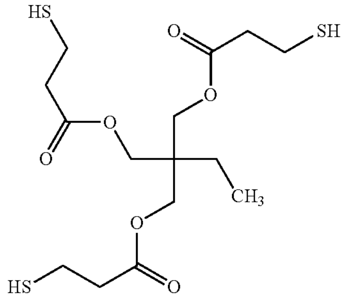

[Chemical Formula 2c]

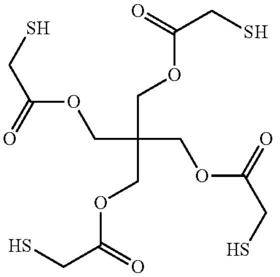

[Chemical Formula 2d]

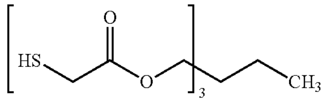

[Chemical Formula 2e]

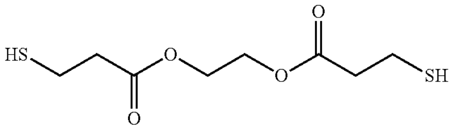

The thiol-based additive may be included in an amount of 0.1 parts by weight to 10 parts by weight, for example 0.1 parts by weight to 5 parts by weight based on 100 parts by weight of components constituting the quantum dot-containing layer. When the thiol-based additive is included within the ranges, stability of a photoconversion material such as a quantum dot may be improved, the thiol group in the component reacts with an acrylic group of a resin or a monomer to form a covalent bond and thereby heat resistance of a photoconversion material such as a quantum dot may be improved.

The quantum dot-containing layer may further include a polymerization inhibitor including a hydroquinone-based compound, a catechol-based compound, or a combination thereof. As the quantum dot-containing layer further includes the hydroquinone-based compound, catechol-based compound, or combination thereof, after printing (coating) a composition including quantum dots, crosslinking at room temperature may be prevented during exposure.

For example, the hydroquinone-based compound, catechol-based compound, or combination thereof may include hydroquinone, methyl hydroquinone, methoxyhydroquinone, t-butyl hydroquinone, 2,5-di-t-butyl hydroquinone, 2,5-bis(1,1-dimethylbutyl) hydroquinone, 2,5-bis(1,1,3,3-tetramethylbutyl) hydroquinone, catechol, t-butyl catechol, 4-methoxyphenol, pyrogallol, 2,6-di-t-butyl-4-methylphenol, 2-naphthol, tris(N-hydroxy-N-nitrosophenylaminato-O, O') aluminium, or a combination thereof, but is not necessarily limited thereto.

The hydroquinone-based compound, catechol-based compound, or combination thereof may be used in the form of a dispersion, and the polymerization inhibitor in the dispersion form may be included in an amount of 0.001 parts by weight to 1 part by weight, for example 0.01 parts by weight to 0.1 parts by weight, based on 100 weight of components constituting a layer including a quantum dot and a fluorescent dye or a quantum dot-containing layer (including no fluorescent dye). When the stabilizer is included within the above range, the problem with aging at room temperature may be solved and sensitivity reduction and surface peeling may be prevented.

The quantum dot-containing layer may include malonic acid; 3-amino-1,2-propanediol; a silane-based coupling agent; a leveling agent; a fluorine-based surfactant; or combination thereof in addition to the thiol-based additive and polymerization inhibitor.

In addition, the quantum dot-containing layer may further include a silane coupling agent having a reactive substituent such as a carboxyl group, a methacryloyl group, an isocyanate group, an epoxy group, and the like to improve its close-contacting properties to a substrate.

Examples of the silane-based coupling agent may include trimethoxysilyl benzoic acid, γ-methacryl oxypropyl trimethoxysilane, vinyl triacetoxysilane, vinyl trimethoxysilane, γ-isocyanate propyl triethoxysilane, Y-glycidoxy propyl trimethoxysilane, β-epoxycyclohexyl)ethyltrimethoxysilane, and the like. These may be used alone or in a mixture of two or more.

The silane-coupling agent may be included in an amount of 0.01 parts by weight to 10 parts by weight based on 100 parts by weight of components constituting the quantum dot-containing layer. When the silane-coupling agent is included within the range, close contacting property, storing property, and the like may be improved.

In addition, the quantum dot-containing layer may further include a surfactant, for example a fluorine-based surfactant to improve coating and prevent a defect if necessary.

Examples of the fluorine-based surfactant may be BM-1000® and BM-1100® of BM Chemie Inc.; MEGAFACE F 142D®, F 172®, F 173®, and F 183® of Dainippon Ink Kagaku Kogyo Co., Ltd.; FULORAD FC-135®, FULORAD FC-170C®, FULORAD FC-430®, and FULORAD FC-431® of Sumitomo 3M Co., Ltd.; SURFLON S-112®, SURFLON S-113®, SURFLON S-131®, SURFLON S-141®, and SURFLON S-145® of ASAHI Glass Co., Ltd.; and SH-28PA®, SH-190®, SH-193®, SZ-6032®, and SF-8428®, and the like of Toray Silicone Co., Ltd.; F-482, F-484, F-478, F-554 and the like of DIC Co., Ltd.

The fluorine-based surfactant may be included in an amount of 0.001 parts by weight to 5 parts by weight based on 100 parts by weight of components constituting the quantum dot-containing layer. When the fluorine-based surfactant is included within the range, excellent wetting on a glass substrate as well as coating uniformity may be secured, but a stain may not be produced.

In addition, a certain amount of other additives such as antioxidants and stabilizers may be further added to the quantum dot-containing layer within a range that does not impair physical properties.

A method of manufacturing each of the quantum dot-containing layers may include coating a curable composition including the above-described components and the like on a substrate by an ink jet spraying method (S1) to form a pattern; and curing the pattern (S2).

(S1) Formation of Pattern

The curable composition is coated on a substrate in a thickness of 0.5 to 10 μm in an ink jet dispersion method. According to the inkjet dispersion, a pattern may be formed by repetitively dispersing desired colors one by one or simultaneously dispersing the desired colors to simplify the process.

(S2) Curing

A cured resin film can be obtained by curing the obtained pattern. At this time, a thermal curing process is preferable as a method of curing. The thermal curing process may be a process of first removing the solvent in the curable composition by heating at a temperature of greater than or equal to about 100° C. for about 3 minutes, and then curing by heating at a temperature of 160° C. to 300° C., and more desirably heating at a temperature of 180° C. to 250° C. for about 30 minutes.

In addition, each of the quantum dot-containing layers may be manufactured without ink jetting. The manufacturing method in this case includes, coating the curable composition including the aforementioned components, for example, at a thickness of 0.5 μm to 10 μm using a suitable method such as spin coating, roller coating, spray coating, etc. on a substrate subjected to a predetermined pretreatment, and irradiating the resultant with light to form a pattern required for the color filter. As a light source used for irradiation, UV, electron beam, or X-ray may be used, and for example, UV in a region of 190 nm to 450 nm, specifically 200 nm to 400 nm may be irradiated. In the irradiation process, a photoresist mask may be further used. After performing the irradiation process in this way, the composition layer irradiated with the light source is treated with a developing solution. At this time, the unexposed portion of the composition layer is dissolved to form a pattern necessary for the color filter. By repeating this process according to the number of required colors, a color filter having a desired pattern may be obtained. In addition, when an image pattern obtained by development in the above process is heated again or cured by irradiation with actinic rays, crack resistance and solvent resistance may be improved.

The curable composition may further include a solvent.

The solvent may include compounds of alcohols such as methanol, ethanol, and the like; glycol ethers such as ethylene glycol methylether, ethylene glycol ethylether, propylene glycol methylether, and the like; cellosolve acetates such as methyl cellosolve acetate, ethyl cellosolve acetate, diethyl cellosolve acetate, and the like; carbitols such as methylethyl carbitol, diethyl carbitol, diethylene glycol monomethylether, diethylene glycol monoethylether, diethylene glycol dimethylether, diethylene glycol methylethylether, diethylene glycol diethylether, and the like; propylene glycol alkylether acetates such as propylene glycol monomethylether acetate, propylene glycol propylether acetate, and the like; ketones such as methylethylketone, cyclohexanone, 4-hydroxy-4-methyl-2-pentanone, methyl-n-propylketone, methyl-n-butylketone, methyl-n-amylketone, 2-heptanone, and the like; saturated aliphatic monocarboxylic acid alkyl esters such as ethyl acetate, n-butyl acetate, isobutyl acetate, and the like; lactic acid alkyl esters such as methyl lactate, ethyl lactate, and the like; hydroxyacetic acid alkyl esters such as methyl hydroxyacetate, ethyl hydroxyacetate, butyl hydroxyacetate, and the like; acetic acid alkoxyalkyl esters such as methoxymethyl acetate, methoxyethyl acetate, methoxybutyl acetate, ethoxymethyl acetate, ethoxyethyl acetate, and the like; 3-hydroxypropionic acid alkyl esters such as methyl 3-hydroxypropionate, ethyl 3-hydroxypropionate, and the like; 3-alkoxypropionic acid alkyl esters such as methyl 3-methoxypropionate, ethyl 3-methoxypropionate, ethyl 3-ethoxypropionate, methyl 3-ethoxypropionate, and the like; 2-hydroxypropionic acid alkyl esters such as methyl 2-hydroxypropionate, ethyl 2-hydroxypropionate, propyl 2-hydroxypropionate, and the like; 2-alkoxypropionic acid alkyl esters such as methyl 2-methoxypropionate, ethyl 2-methoxypropionate, ethyl 2-ethoxypropionate, methyl 2-ethoxypropionate, and the like; 2-hydroxy-2-methylpropionic acid alkyl esters such as methyl 2-hydroxy-2-methylpropionate, ethyl 2-hydroxy-2-methylpropionate, and the like; 2-alkoxy-2-methylpropionic acid alkyl esters such as methyl 2-methoxy-2-methylpropionate, ethyl 2-ethoxy-2-methylpropionate, and the like; esters such as 2-hydroxyethyl propionate, 2-hydroxy-2-methylethyl propionate, hydroxyethyl acetate, methyl 2-hydroxy-3-methylbutanoate, and the like; or ketone acid esters such as ethyl pyruvate, and the like. In addition, N-methylformamide, N,N-dimethyl formamide, N-methylformanilide, N-methylacetamide, N,N-dimethyl acetamide, N-methylpyrrolidone, dimethylsulfoxide, benzylethylether, dihexylether, acetylacetone, isophorone, caproic acid, caprylic acid, 1-octanol, 1-nonanol, benzylalcohol, benzyl acetate, ethyl benzoate, diethyl oxalate, diethyl maleate, γbutyrolactone, ethylene carbonate, propylene carbonate, phenyl cellosolve acetate, dimethyladipate may also be used, but is not limited thereto.

For example, the solvent may be desirably glycol ethers such as ethylene glycol monoethylether, ethylenediglycolmethylethylether, and the like; ethylene glycol alkylether acetates such as ethyl cellosolve acetate, and the like; esters such as 2-hydroxy ethyl propionate, and the like; carbitols such as diethylene glycol monomethylether, and the like; propylene glycol alkylether acetates such as propylene glycol monomethylether acetate, propylene glycol propylether acetate, and the like; alcohols such as ethanol, and the like, or a combination thereof.

For example, the solvent may include propylene glycol monomethylether acetate, dipropylene glycol methylether acetate, ethanol, ethylene glycoldimethylether, ethylenediglycolmethylethylether, diethylene glycoldimethylether, dimethyl acetamide, 2-butoxyethanol, N-methylpyrrolidine, N-ethylpyrrolidine, propylene carbonate, γ-butyrolactone, dimethyladipate, or a combination thereof.

The solvent may be included in a balance amount based on a total amount of the curable composition.

MODE FOR INVENTION

Hereinafter, examples of the present invention are described. These examples, however, are not in any sense to be interpreted as limiting the scope of the invention.

EXAMPLES

Synthesis Examples

Each compound was diluted into a concentration of 10 ppm by using a cyclohexanone solvent and a maximum absorption wavelength was measured using a UV/VIS spectrophotometer (Lamda25, PerkinElmer, Inc.).

Synthesis Example 1: Synthesis of Compound Represented by Chemical Formula 1-1

(Reaction Scheme 1)

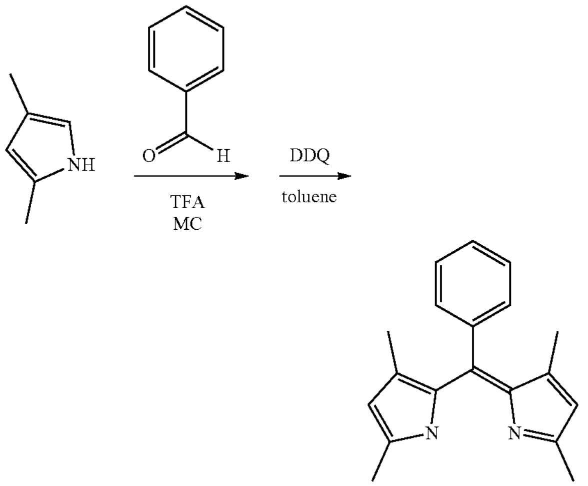

2,4-dimethylpyrrole (10 g, 105 mmol), benzaldehyde (2.79 g, 26.28 mmol) and 500 ml of dichloromethane (DCM) were put into a 2 L round-bottomed flask, and then, stirred at room temperature for 30 minutes. 0.2 ml of trifluoroacetic acid was added thereto in a dropwise fashion and then, stirred at room temperature for 16 hours. A solution prepared by dissolving 2,3-dichloro-5,6-dicyano-1,4-benzoquinone (DDQ) (5.94 g, 26.28 mmol) in 50 ml of toluene was added thereto in a dropwise fashion and then, additionally stirred for 4 hours. After removing the solvent, the residue was purified with a mixed solution of ethylacetate/hexane/TEA (20%/80%/0.2%) through column chromatography and dried. (Yield: 40%, 3 g)

(Reaction Scheme 2)

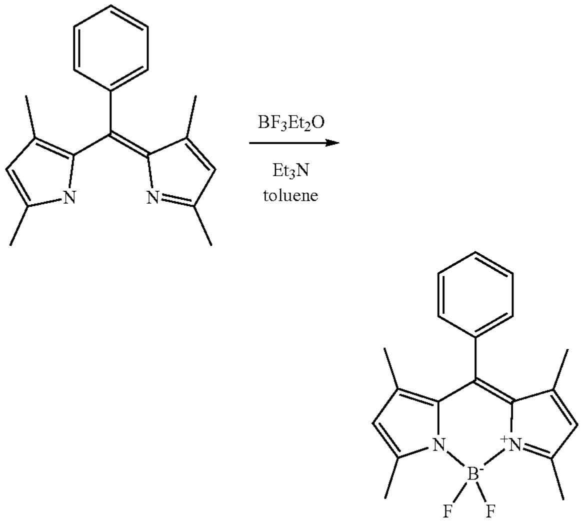

3 g (11 mmol) of the product from Reaction Scheme 1, 300 ml of toluene, and 4.6 ml (33 mmol) of triethylamine were sequentially put into a 2 L round-bottomed flask and then, stirred. 6.7 ml (55 mol) of $BF_3 \cdot Et_2O$ was added thereto and then, stirred at 100° C. for 4 hours. After removing the solvent, the residue was purified with a mixed solution of methylene chloride/hexane/TEA (80%/20%/0.2%) through column chromatography and then, dried. (Yield: 85%, 3 g)

(Reaction Scheme 3)

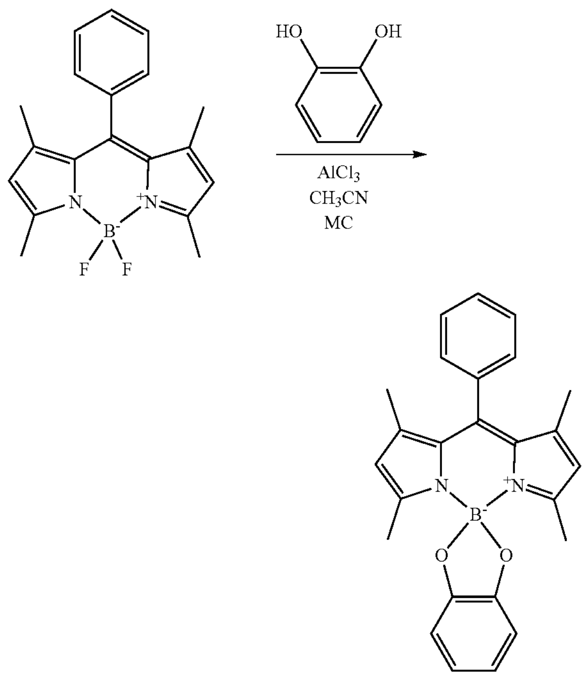

3 g (9.25 mmol) of the product from Reaction Scheme 2 and 300 ml of methylene chloride were put into a 2 L round-bottomed flask, and then, stirred. 3.1 g (23 mmol) of aluminum chloride was added thereto and then, stirred for 5 minutes. A solution prepared by dissolving 4.1 g (37 mmol) of catechlol in 30 ml of acetonitrile was added to the reactants and then, the resultant was stirred at room temperature for 30 minutes. After washing the reactants with water and removing the solvent, methanol was added thereto and then, stirred. A solid precipitated therein was filtered and dried to obtain a compound represented by Chemical Formula 1-1. (Yield: 50%, 1.82 g)

[Chemical Formula 1-1]

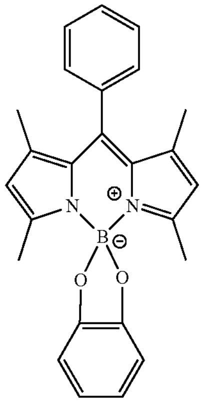

Synthesis Example 2; Synthesis of Compound Represented by Chemical Formula 1-2

A compound represented by Chemical Formula 1-2 was synthesized according to the same synthesis method as in Synthesis Example 1 except that 2,4,6-trimethylbenzaldehyde was used instead of the benzaldehyde.

[Chemical Formula 1-2]

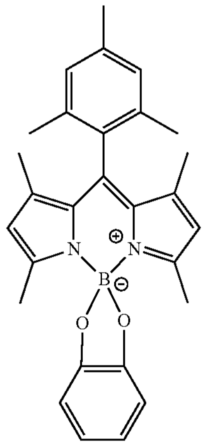

Synthesis Example 3: Synthesis of Compound Represented by Chemical Formula 1-3

A compound represented by Chemical Formula 1-3 was synthesized according to the same synthesis method as in Synthesis Example 1 except that 4-(trifluoromethyl)benzaldehyde was used instead of the benzaldehyde.

[Chemical Formula 1-3]

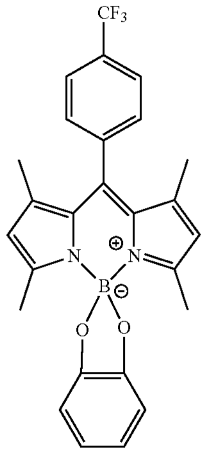

Synthesis Example 4: Synthesis of Compound Represented by Chemical Formula 1-4

A compound represented by Chemical Formula 1-4 was synthesized according to the same synthesis method as in Synthesis Example 1 except that 4-(1-ethoxyvinyl)benzaldehyde was used instead of the benzaldehyde.

[Chemical Formula 1-4]

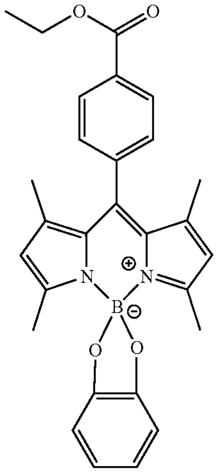

Synthesis Example 5: Synthesis of Compound Represented by Chemical Formula 1-5

A compound represented by Chemical Formula 1-5 was synthesized according to the same synthesis method as in Synthesis Example 1 except that acetaldehyde was used instead of the benzaldehyde.

[Chemical Formula 1-5]

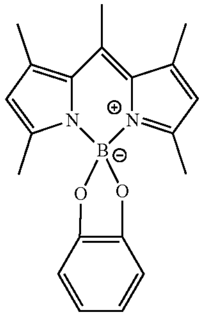

Synthesis Example 6: Synthesis of Compound Represented by Chemical Formula 1-6

A compound represented by Chemical Formula 1-6 was synthesized according to the same synthesis method as in Synthesis Example 1 except that 2-ethylhexanal was used instead of the benzaldehyde.

[Chemical Formula 1-6]

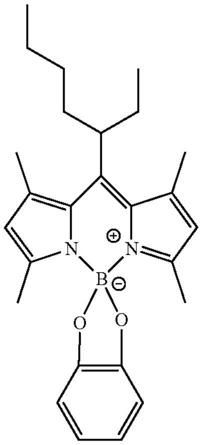

Synthesis Example 7: Synthesis of Compound Represented by Chemical Formula 1-7

A compound represented by Chemical Formula 1-7 was synthesized according to the same synthesis method as in Synthesis Example 1 except that 2,3-dihydroxynaphthalene was used instead of the catechol.

[Chemical Formula 1-7]

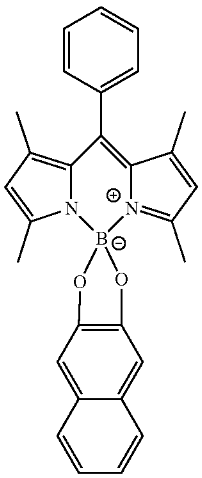

Synthesis Example 8; Synthesis of Compound Represented by Chemical Formula 1-8

A compound represented by Chemical Formula 1-8 was synthesized according to the same synthesis method as in Synthesis Example 1 except that 4-tert-butylcatechol was used instead of the catechol.

[Chemical Formula 1-8]

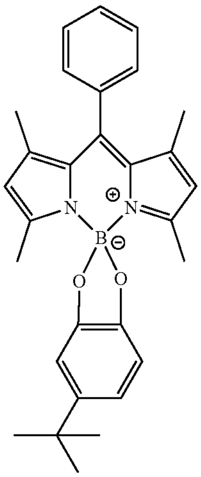

Synthesis Example 9: Synthesis of Compound Represented by Chemical Formula 1-1-1

(Reaction Scheme 4)

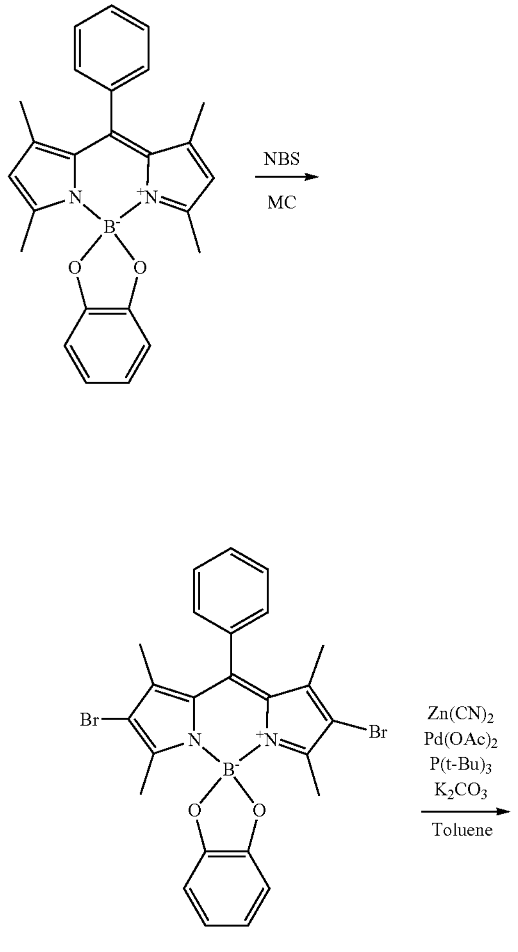

Intermediate

-continued

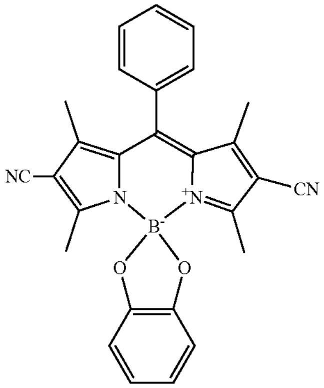

(1) The compound represented by Chemical Formula 1-1 (1 g, 2.54 mmol), methylene chloride (MC, 20 ml), and NBS (N-bromosuccinimide, 0.90 g, 5.07 mmol) were sequentially put into a round flask, and stirred at room temperature for 1 hour. The reaction product obtained after stirring was purified using column chromatography and dried to synthesize 1.37 g (Yield: 98%) of the intermediate.

(2) The intermediate (1 g, 1.81 mmol) and zinc cyanide (0.47 g, 4.0 mmol), palladium acetate (0.02 g, 0.09 mmol), tritertbutylphosphine (0.035 g, 0.36 mmol), potassium carbonate (0.75 g, 5.43 mmol), and toluene (20 ml) were sequentially put into a round flask. The mixture was stirred at 100° C. for 24 hours, cooled to room temperature, purified using column chromatography, and dried to synthesize 0.38 g (Yield: 47%) of a compound represented by Chemical Formula 1-1-1.

[Chemical Formula 1-1-1]

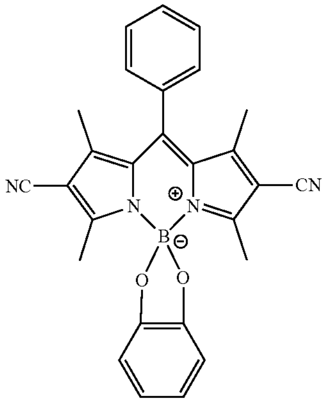

$[M+H]^+$ 444.3, $\lambda_{max}$=504 nm

Synthesis Example 10: Synthesis of Compound Represented by Chemical Formula 1-1-2

(Reaction Scheme 5)

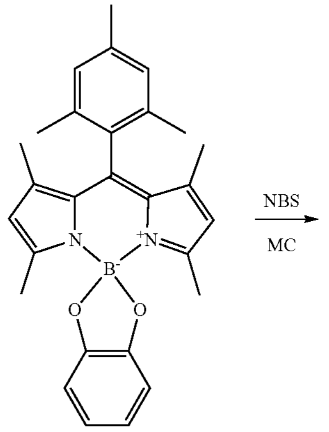

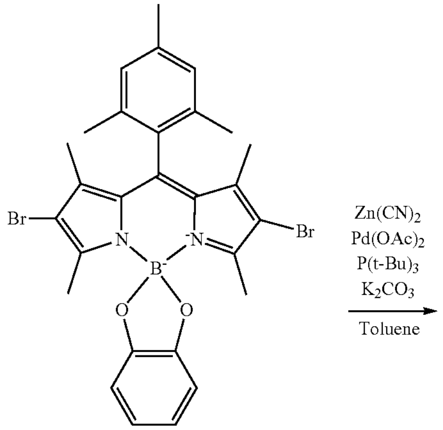

Intermediate

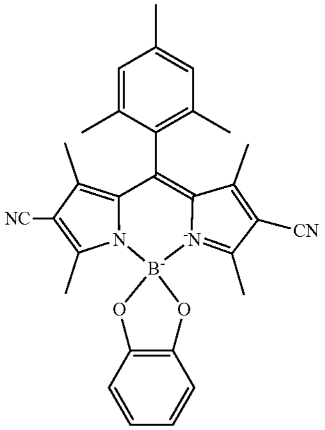

A compound represented by Chemical Formula 1-1-2 was synthesized according to the same synthesis method as in Synthesis Example 9, except that the compound represented by Chemical Formula 1-2 was used instead of the compound represented by Chemical Formula 1-1.

[Chemical Formula 1-1-2]

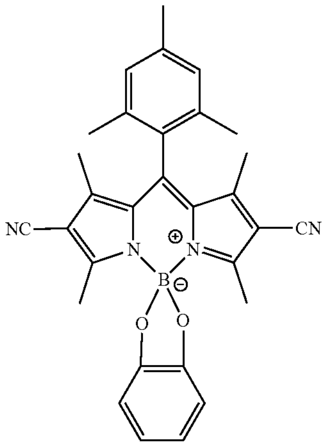

$[M+H]^+$ 486.4, $\lambda_{max}$=505 nm

Synthesis Example 11: Synthesis of Compound Represented by Chemical Formula 1-1-3

(Reaction Scheme 6)

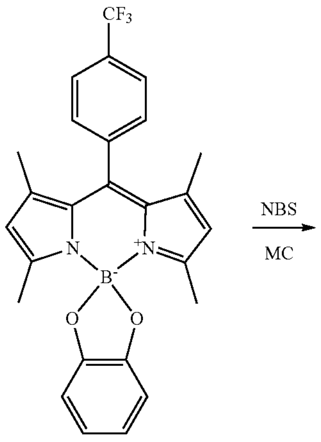

-continued

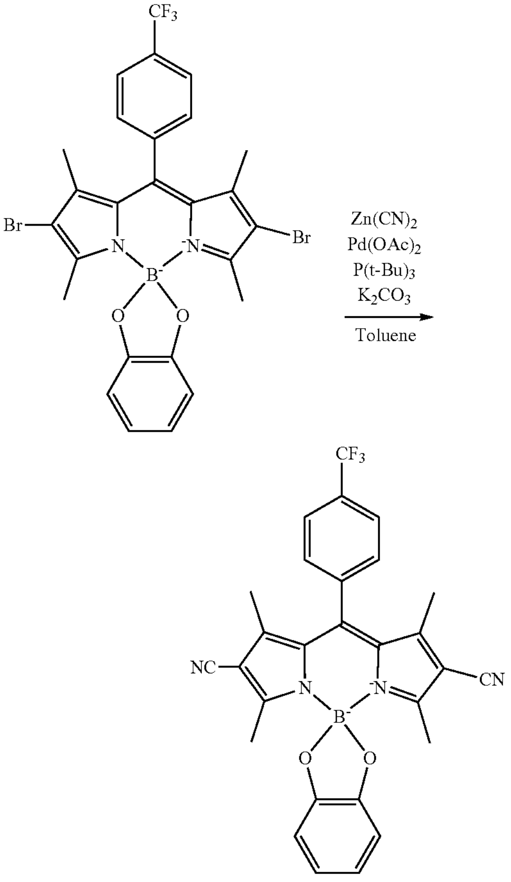

A compound represented by Chemical Formula 1-1-3 was synthesized according to the same synthesis method as in Synthesis Example 9, except that the compound represented by Chemical Formula 1-3 was used instead of the compound represented by Chemical Formula 1-1.

[Chemical Formula 1-1-3]

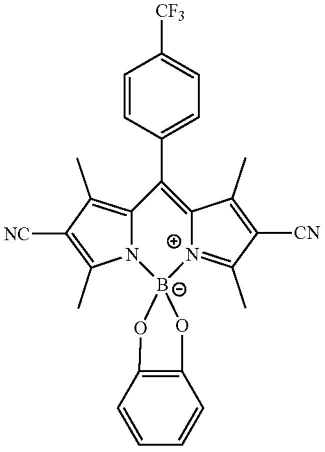

$[M+H]^+$ 512.3, $\lambda_{max}$=507 nm

Synthesis Example 12: Synthesis of Compound Represented by Chemical Formula 1-1-4

(Reaction Scheme 7)

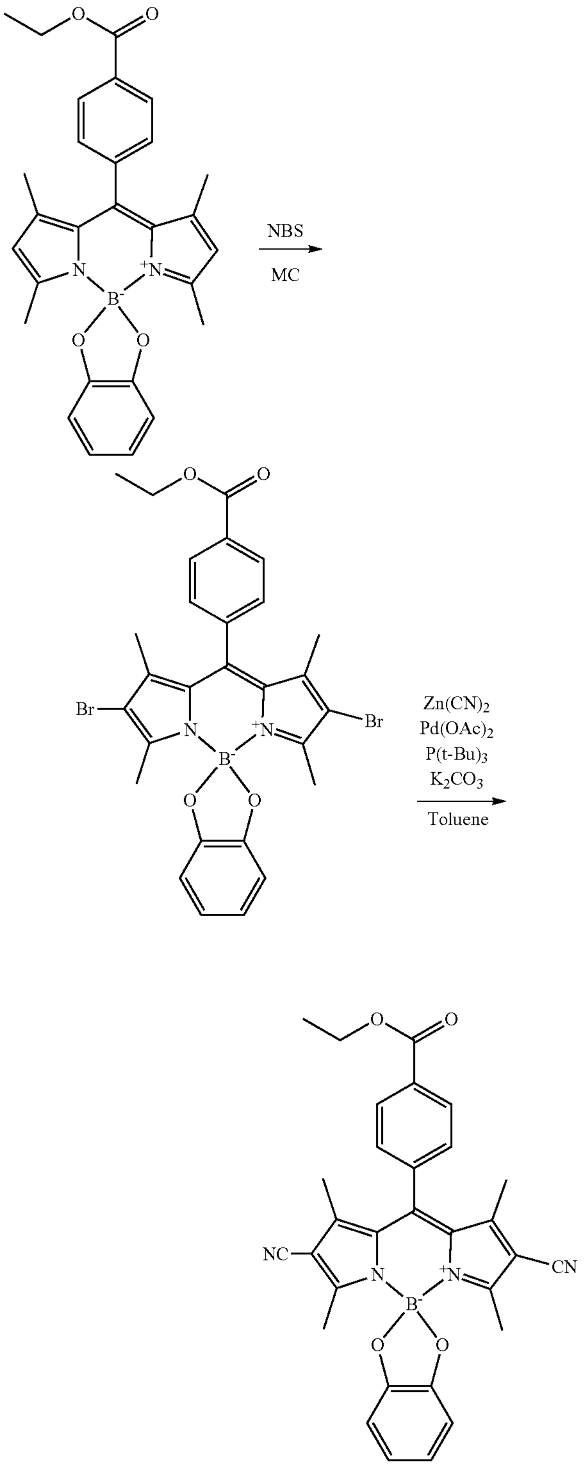

A compound represented by Chemical Formula 1-1-4 was synthesized according to the same synthesis method as in Synthesis Example 9, except that the compound represented by Chemical Formula 1-4 was used instead of the compound represented by Chemical Formula 1-1.

[Chemical Formula 1-1-4]

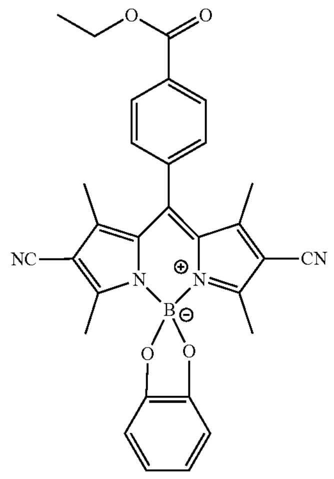

$[M+H]^+$ 516.4, $\lambda_{max}$=506 nm

Synthesis Example 13: Synthesis of Compound Represented by Chemical Formula 1-1-5

(Reaction Scheme 8)

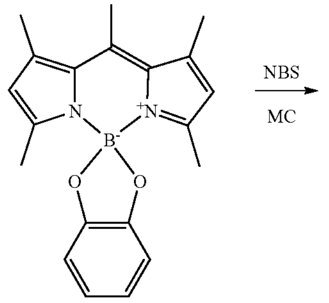

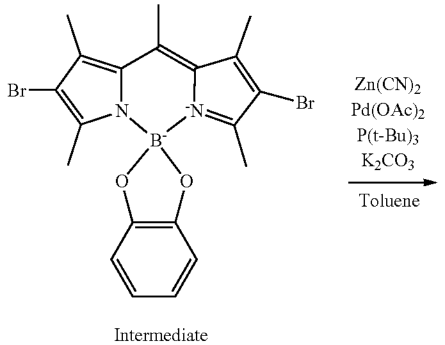

Intermediate

-continued

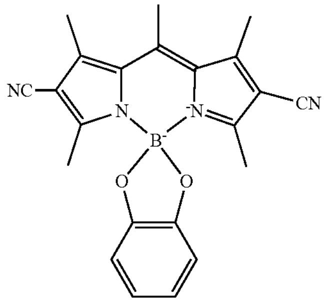

A compound represented by Chemical Formula 1-1-5 was synthesized according to the same synthesis method as in Synthesis Example 9, except that the compound represented by Chemical Formula 1-5 was used instead of the compound represented by Chemical Formula 1-1.

[Chemical Formula 1-1-5]

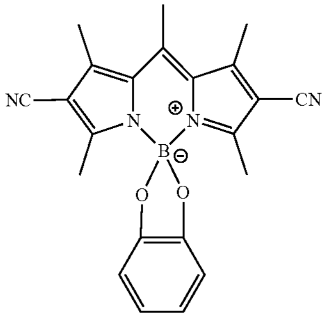

$[M+H]^+$ 382.2, $\lambda_{max}$=503 nm

Synthesis Example 14: Synthesis of Compound Represented by Chemical Formula 1-1-6

(Reaction Scheme 9)

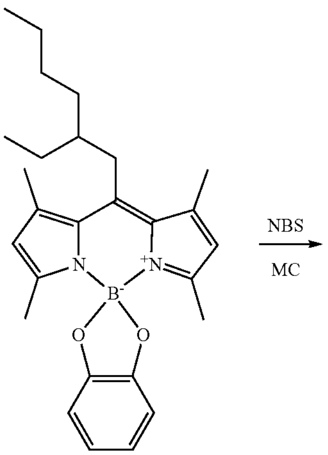

-continued

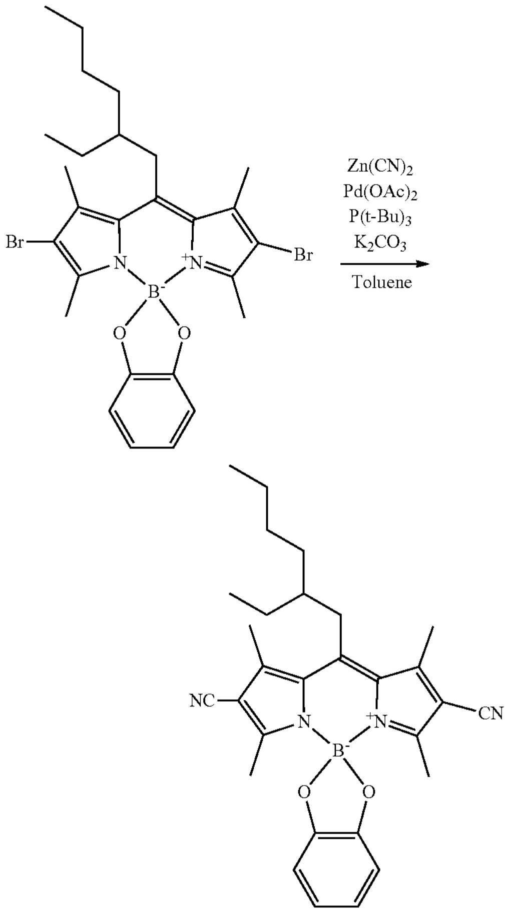

A compound represented by Chemical Formula 1-1-6 was synthesized according to the same synthesis method as in Synthesis Example 9, except that the compound represented by Chemical Formula 1-6 was used instead of the compound represented by Chemical Formula 1-1.

[Chemical Formula 1-1-6]

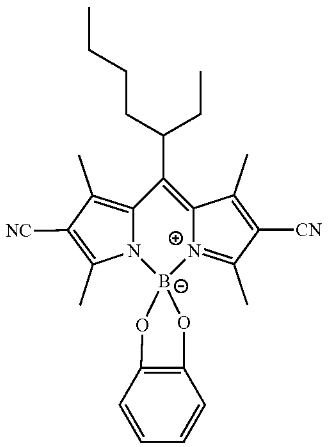

$[M+H]^+$480.4, $\lambda_{max}$=504 mm

Synthesis Example 15: Synthesis of Compound Represented by Chemical Formula 1-1-7

(Reaction Scheme 10)

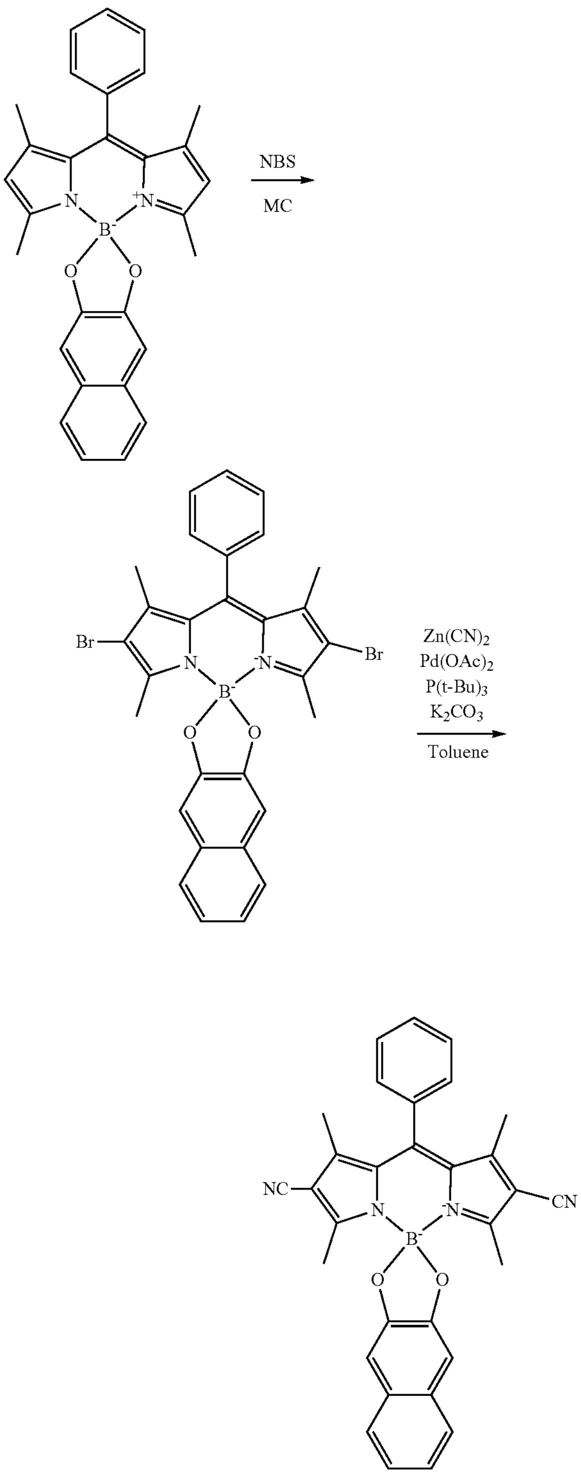

A compound represented by Chemical Formula 1-1-7 was synthesized according to the same synthesis method as in Synthesis Example 9, except that the compound represented by Chemical Formula 1-7 was used instead of the compound represented by Chemical Formula 1-1.

[Chemical Formula 1-1-7]

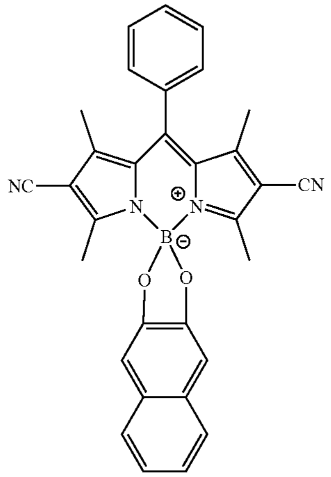

$[M+H]^+$ 494.4, $\lambda_{max}$=507 nm

Synthesis Example 16: Synthesis of Compound Represented by Chemical Formula 1-1-8

(Reaction Scheme 11)

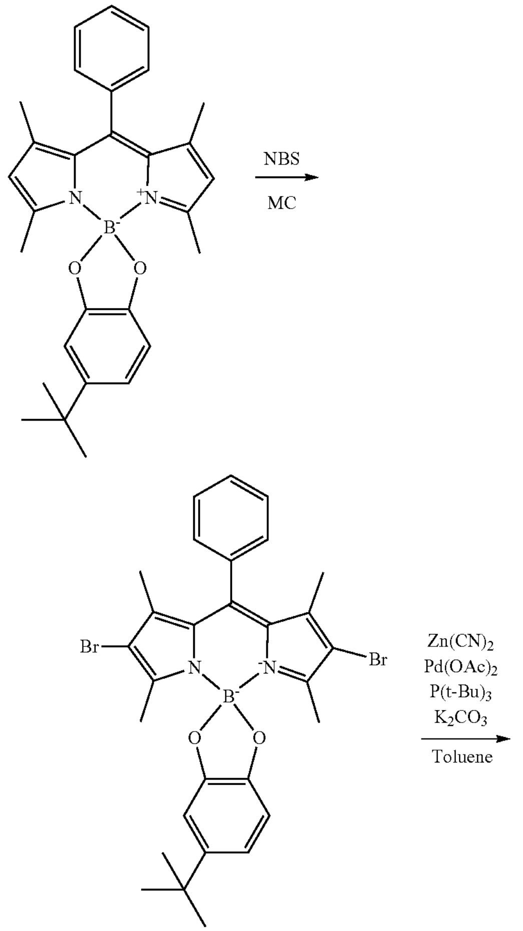

-continued

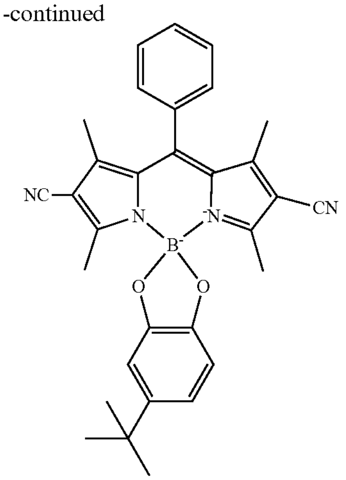

A compound represented by Chemical Formula 1-1-8 was synthesized according to the same synthesis method as in Synthesis Example 9, except that the compound represented by Chemical Formula 1-8 was used instead of the compound represented by Chemical Formula 1-1.

[Chemical Formula 1-1-8]

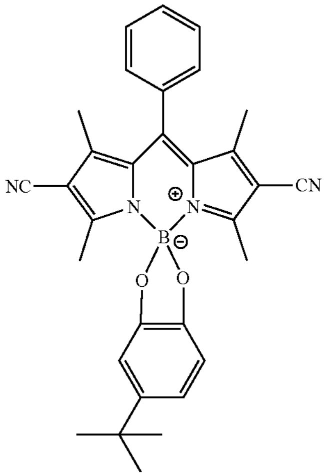

$[M+H]^+$ 500.4, $\lambda_{max}$=507 nm

Comparative Synthesis Example 1 to Comparative Synthesis Example 3; Synthesis of Compounds Represented by Chemical Formula C-1 to Chemical Formula C-3

With reference to the synthesis examples such as Synthesis Example 1 and Synthesis Example 9, compounds having the following three structures were synthesized.

[Chemical Formula C-1]

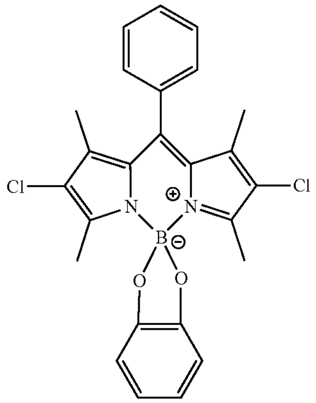

$[M+H]^+$ 463.2, $\lambda_{max}$=532 nm

Comparative Synthesis Example 2: Synthesis of Compound Represented by Chemical Formula C-2 (Intermediate of Reaction Scheme 4)

[Chemical Formula C-2]

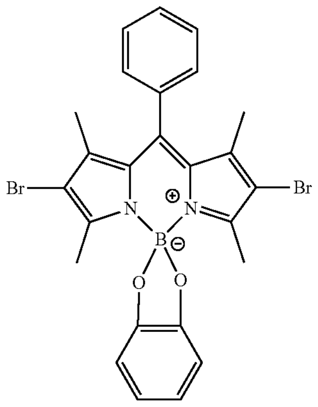

$[M+H]^+$ 552.07, $\lambda_{max}$=528 nm

Comparative Example 3: Compound Represented by Chemical Formula 1-1

[Chemical Formula 1-1]

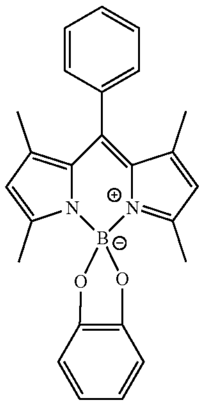

$[M+H]^+$ 395, $\lambda_{max}$=507 nm (Evaluation 1: Wavelength Matching)

From the structures of the compounds according to Synthesis Example 9 to Synthesis Example 16 and the maximum absorption wavelength of each compound, the compound according to an embodiment exhibited the maximum absorption wavelengths between 500 nm and 510 nm due to the structure represented by Chemical Formula 1.

(Manufacture of Antireflection Film)

Example 1

100 parts by weight of a monomer mixture including 99 parts by weight of n-butylacrylate and 1 part by weight of 2-hydroxyethylacrylate and 150 parts by weight of ethylacetate were put into a 1 L reactor equipped with a condenser to conveniently control a temperature, in which nitrogen gas was refluxed, and while the flask was stirred, nitrogen gas was injected thereinto for 1 hour to substitute nitrogen for oxygen in the reactor, and then, the reactor was maintained at 70° C. 0.06 parts by weight of 2,2'-azobisisobutyronitrile as an initiator was added thereto and then, reacted for 8 hours to prepare a solution containing a (meth)acryl-based copolymer. The (meth)acryl-based copolymer had Tg of −46° C. and a weight average molecular weight of 1,100,000 g/mol. Subsequently, ethylacetate was added thereto, preparing 19.4 wt % of a (meth)acryl-based copolymer solution. Based on a solid content of 100 parts by weight of the (meth)acryl-based copolymer, 0.193 parts by weight of an XDI-based isocyanate-based crosslinking agent (75% of a solid content, TD-75, Soken Chemical Co., Ltd.), 0.154 parts by weight of 3-glycidoxypropyl trimethoxysilane (KBM-403, ShinEtsu Chemical Co.) as a silane coupling agent, and 0.06 parts by weight of the compound (represented by Chemical Formula 1-1-1) according to Synthesis Example 9 were mixed. Subsequently, 25 parts by weight of methylethylketone was added thereto to prepare an adhesive layer composition.

The adhesive layer composition was directly coated with a bar-coater on the bottom surface of a PET film, which was a base film of an antireflection layer (an antireflection layer formed by sequentially stacking a hard coating layer, a high refractive layer, and a low refractive layer on the upper surface of the PET film, Reflectance: 0.2%, DNP, LLC) and then, dried in a 90° C. oven for 4 minutes to form a 20 μm-thick antireflection film.

Example 2

An antireflection film was formed according to the same method as Example 1 except that the compound (represented by Chemical Formula 1-1-2) of Synthesis Example 10 was used instead of the compound (represented by Chemical Formula 1-1-1) of Synthesis Example 9.

Example 3

An antireflection film was formed according to the same method as Example 1 except that the compound (represented by Chemical Formula 1-1-3) of Synthesis Example 11 was used instead of the compound (represented by Chemical Formula 1-1-1) of Synthesis Example 9.

Example 4

An antireflection film was formed according to the same method as Example 1 except that the compound (represented by Chemical Formula 1-1-4) of Synthesis Example 12 was used instead of the compound (represented by Chemical Formula 1-1-1) of Synthesis Example 9.

Example 5

An antireflection film was formed according to the same method as Example 1 except that the compound (represented by Chemical Formula 1-1-5) of Synthesis Example 13 was used instead of the compound (represented by Chemical Formula 1-1-1) of Synthesis Example 9.

Example 6

An antireflection film was formed according to the same method as Example 1 except that the compound (represented by Chemical Formula 1-1-6) of Synthesis Example 14 was used instead of the compound (represented by Chemical Formula 1-1-1) of Synthesis Example 9.

Example 7

An antireflection film was formed according to the same method as Example 1 except that the compound (represented by Chemical Formula 1-1-7) of Synthesis Example 15 was used instead of the compound (represented by Chemical Formula 1-1-1) of Synthesis Example 9.

Example 8

An antireflection film was formed according to the same method as Example 1 except that the compound (represented by Chemical Formula 1-1-8) of Synthesis Example 16 was used instead of the compound (represented by Chemical Formula 1-1-1) of Synthesis Example 9.

Comparative Example 1

An antireflection film was formed according to the same method as Example 1 except that the compound (represented by Chemical Formula C-1) of Comparative Synthesis Example 1 was used instead of the compound (represented by Chemical Formula 1-1-1) of Synthesis Example 9.

Comparative Example 2

An antireflection film was formed according to the same method as Example 1 except that the compound (represented by Chemical Formula C-2) of Comparative Synthesis Example 2 was used instead of the compound (represented by Chemical Formula 1-1-1) of Synthesis Example 9.

Comparative Example 3

An antireflection film was formed according to the same method as Example 1 except that the compound (represented by Chemical Formula 1-1) of Comparative Synthesis Example 3 was used instead of the compound (represented by Chemical Formula 1-1-1) of Synthesis Example 9.

(Evaluation 3: Light Resistance Reliability)

In order to evaluate whether or not light resistance reliability of a film for a panel formed by applying quantum dots was improved, an optical member (manufactured by stacking the antireflection film on the other surface of a glass having a quantum dot-containing layer on one surface) was manufactured and then, evaluated with respect to the light resistance reliability by measuring light transmittance at a maximum absorption wavelength of the compound before and after irradiation under a condition of (light source lamp: xenon lamp, irradiation intensity: 0.35 W/cm$^2$, irradiation temperature: 63° C., irradiation time: 500 hours, and irradiation direction: irradiation from the antireflection film] in a xenon test chamber (Q-SUN) and using a change of the light transmittance, and the results are shown in Table 1. The change of the light transmittance was an absolute value of a light transmittance difference before and after the irradiation.

TABLE 1

| | Light resistance reliability (ΔT %) |
|---|---|
| Example 1 | 3.3 |
| Example 2 | 3.5 |
| Example 3 | 3.0 |
| Example 4 | 3.7 |
| Example 5 | 5.2 |
| Example 6 | 4.9 |
| Example 7 | 4.2 |
| Example 8 | 3.9 |
| Comparative Example 1 | 17.3 |
| Comparative Example 2 | 14.1 |
| Comparative Example 3 | 25.4 |

Referring to Table 1, Examples 1 to 8 exhibited improved light resistance reliability, compared with Comparative Examples 1 to 3. In other words, an antireflection film and a quantum dot-containing display device to which a dye compound according to an embodiment was applied effectively absorbed light in blue long wavelength region and a green short wavelength region and thus improved color reproducibility of a quantum dot-applying panel.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

DESCRIPTION OF SYMBOLS

10 blue light source
20 quantum dot-containing layer
30 color filter
40 substrate
50 adhesive layer
60 dye-containing layer
70 antireflection layer
80 antireflection film
100 display device

What is claimed is:

1. An antireflection film comprising a compound represented by Chemical Formula 1:

[Chemical Formula 1]

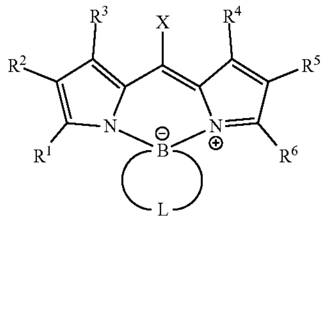

wherein, in Chemical Formula 1, $R^1$, $R^3$, $R^4$, and $R^6$ are each independently a hydrogen atom or a substituted or unsubstituted C1 to C20 alkyl group, $R^2$ and $R^5$ are each independently a hydrogen atom or a cyano group, provided that at least one of $R^2$ and $R^5$ is a cyano group, X is a hydrogen atom, a substituted or unsubstituted C1 to C20 alkoxy group, a substituted or unsubstituted C1 to C20 alkyl group, or a substituted or unsubstituted C6 to C20 aryl group, L is a divalent ligand, and L is a catechol-based ligand, a 2,3-naphthalenediol-based ligand, or a 1,1'-bi-2-naphthol-based ligand.

2. The antireflection film of claim 1, wherein $R^2$ and $R^5$ are each a cyano group.

3. The antireflection film of claim 1, wherein X is:

a substituted or unsubstituted C1 to C20 alkoxy group, a C1 to C20 alkyl group that is unsubstituted or is substituted with an unsubstituted C1 to C10 alkyl group, a C1 to C10 alkyl group that is substituted with a halogen atom, a C1 to C10 alkyl group that is substituted with a C1 to C5 alkyl group, an unsubstituted C1 to C10 alkoxy group, or a combination thereof, or a C6 to C20 aryl group that is unsubstituted or is substituted with an unsubstituted C1 to C10 alkyl group, a C1 to C10 alkyl group that is substituted with a halogen atom, a C1 to C10 alkyl group that is substituted with a C1 to C5 alkyl group, an unsubstituted C1 to C10 alkoxy group, or a combination thereof.

4. The antireflection film of claim 3, wherein X is an unsubstituted C1 to C20 alkoxy group, an unsubstituted C1 to C20 alkyl group, an unsubstituted C6 to C20 aryl group, a C6 to C20 aryl group that is substituted with an unsubstituted C1 to C10 alkyl group, a C6 to C20 aryl group that is substituted with a C1 to C10 alkyl group substituted with a halogen atom, or a C6 to C20 aryl group that is substituted with an unsubstituted C1 to C10 alkoxy group.

5. The antireflection film of claim 1, wherein the compound is represented by one of Chemical Formula 1-1-1 to Chemical Formula 1-1-8:

[Chemical Formula 1-1-1]

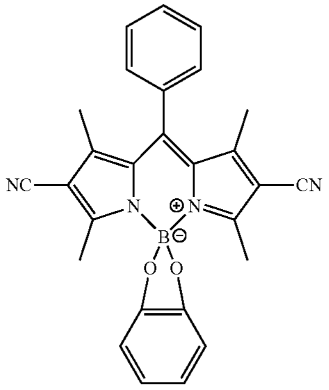

-continued

[Chemical Formula 1-1-2]

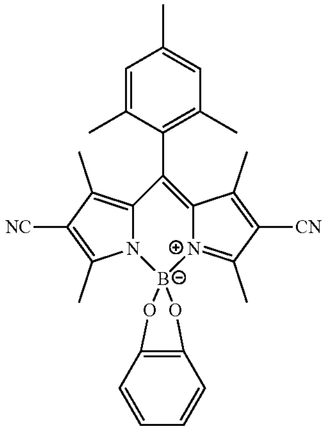

[Chemical Formula 1-1-3]

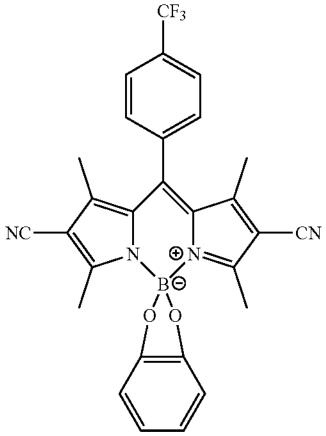

[Chemical Formula 1-1-4]

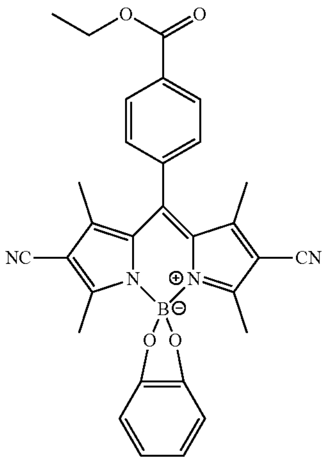

[Chemical Formula 1-1-5]

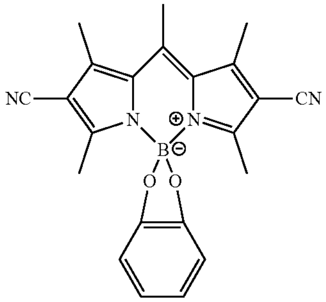

-continued

[Chemical Formula 1-1-6]

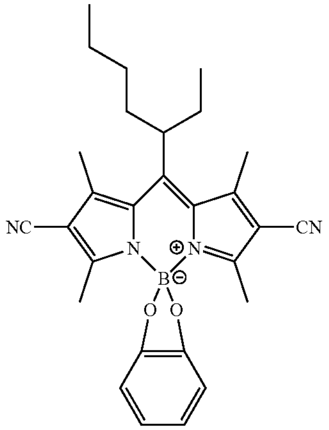

[Chemical Formula 1-1-7]

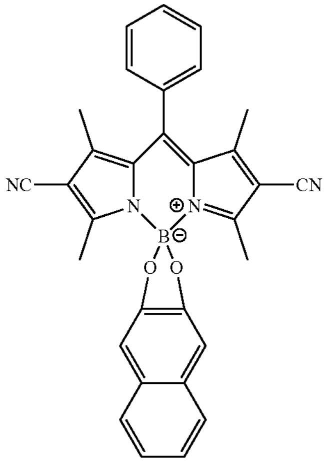

[Chemical Formula 1-1-8]

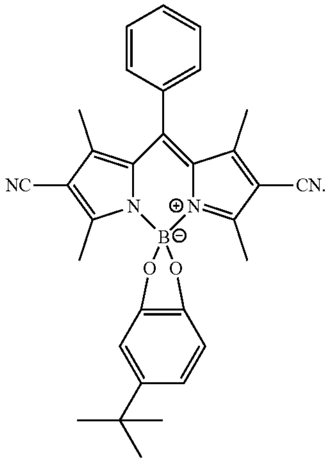

6. The antireflection film of claim 3, wherein the compound exhibits an absorption wavelength at 400 nm to 530 nm, and has a maximum absorption wavelength at 490 nm to 520 nm of the absorption wavelengths.

7. The antireflection film of claim 1, wherein the compound is a dye.

8. The antireflection film of claim 1, wherein:
the antireflection film includes an adhesive layer and an antireflection layer on the adhesive layer, and
the compound is included in the adhesive layer.

9. The antireflection film of claim 1, wherein:
the antireflection film includes an adhesive layer, a dye-containing layer, and an antireflection layer on the dye-containing layer, and
the compound is included in the dye-containing layer.

10. A display device comprising the antireflection film of claim 1.

11. The display device of claim 10, wherein the display device further includes a quantum dot-containing layer.

12. The display device of claim 11, wherein the display device further includes a light source, a color filter, and a substrate.

13. The display device of claim 12, wherein:
in the display device, the quantum dot-containing layer is disposed on the light source,
the color filter is disposed on the quantum dot-containing layer, the substrate is disposed on the color filter, and the antireflection film is disposed on the substrate.

14. The display device of claim 12, wherein the light source is a white light source or a blue light source.

15. The display device of claim 12, wherein the substrate includes a glass substrate.

16. The antireflection film of claim 1, wherein:
Chemical Formula 1 is represented by Chemical Formula B:

[Chemical Formula B]

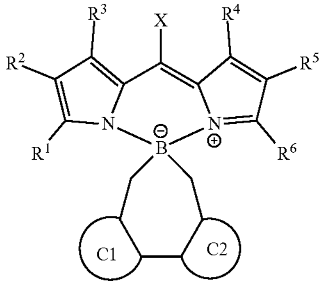

in Chemical Formula B,
$R^1$, $R^3$, $R^4$, and $R^6$ are each independently a hydrogen atom or a substituted or unsubstituted C1 to C20 alkyl group,
$R^2$ and $R^5$ are each independently a hydrogen atom or a cyano group, provided that at least one of $R^2$ and $R^5$ is a cyano group,
X is a hydrogen atom, a substituted or unsubstituted C1 to C20 alkoxy group, a substituted or unsubstituted C1 to C20 alkyl group, or a substituted or unsubstituted C6 to C20 aryl group, and
C1 and C2 are each independently a substituted or unsubstituted aromatic ring.

* * * * *